US008385198B2

(12) United States Patent
Sakaguchi et al.

(10) Patent No.: US 8,385,198 B2
(45) Date of Patent: Feb. 26, 2013

(54) WIRELESS COMMUNICATION SYSTEM, TRANSMISSION TERMINAL, RECEPTION TERMINAL, AND TRANSMISSION METHOD

(75) Inventors: Midori Sakaguchi, Tokyo (JP); Hideaki Kosaka, Tokyo (JP); Tetsuro Shida, Tokyo (JP); Toshimitsu Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 431 days.

(21) Appl. No.: 12/829,478

(22) Filed: Jul. 2, 2010

(65) Prior Publication Data

US 2011/0134895 A1 Jun. 9, 2011

(30) Foreign Application Priority Data

Dec. 4, 2009 (JP) ................................. 2009-276508

(51) Int. Cl.
*G01R 31/08* (2006.01)
(52) U.S. Cl. .................................... 370/230; 370/237
(58) Field of Classification Search ........................ None
See application file for complete search history.

(56) References Cited

U.S. PATENT DOCUMENTS

| 2001/0009407 A1* | 7/2001 | Honda et al. ............. 342/357.09 |
| 2004/0001467 A1 | 1/2004 | Cromer et al. |
| 2005/0239497 A1 | 10/2005 | Bahl et al. |
| 2008/0151849 A1 | 6/2008 | Utsunomiya et al. |
| 2011/0058480 A1* | 3/2011 | Dahlen ......................... 370/237 |

FOREIGN PATENT DOCUMENTS

| JP | 2002-135345 A | 5/2002 |
| JP | 2003-37529 A | 2/2003 |
| JP | 2005-328520 A | 11/2005 |
| JP | 2005-536913 A | 12/2005 |
| JP | 2008-160758 A | 7/2008 |
| JP | 2008-211601 A | 9/2008 |
| JP | 2009-171257 A | 7/2009 |
| WO | WO 2004/004226 A2 | 1/2004 |

* cited by examiner

*Primary Examiner* — David Oveissi
(74) *Attorney, Agent, or Firm* — Birch, Stewart, Kolasch & Birch, LLP

(57) ABSTRACT

The transmission terminal in a wireless communication system includes: a communication unit for intermittently transmitting a radio signal; a transmission-side beacon reception unit; a beacon analysis unit for analyzing the received beacon signal; and a transmission output level change unit for estimating an emission time period of a beacon signal to be received by the transmission-side beacon reception unit on the basis of the beacon period information and the beacon reception time information, thereby obtaining an estimated emission time period; wherein the transmission output level change unit instructs the transmission-side communication unit to transmit the radio signal having a raised transmission output level during at least the estimated emission time period, the raised transmission output level being higher than a transmission output level during a time period other than at least the estimated emission time period.

12 Claims, 15 Drawing Sheets

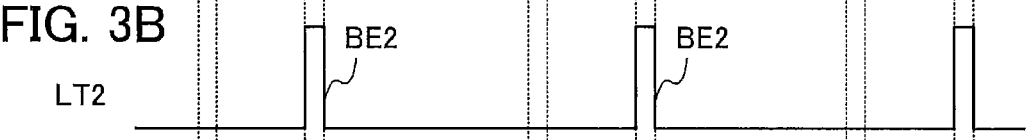
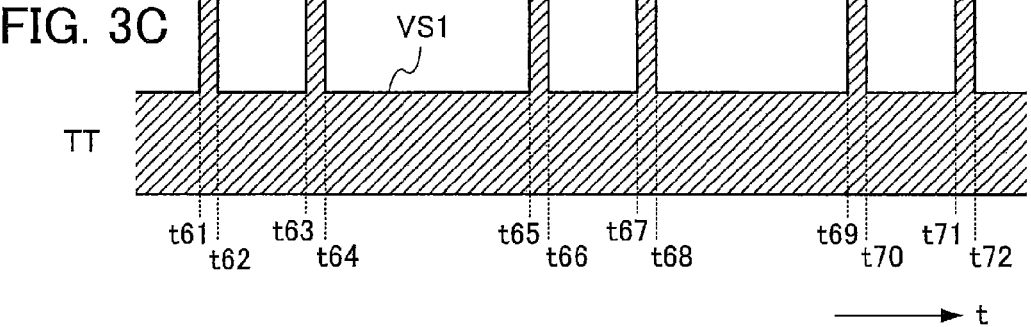
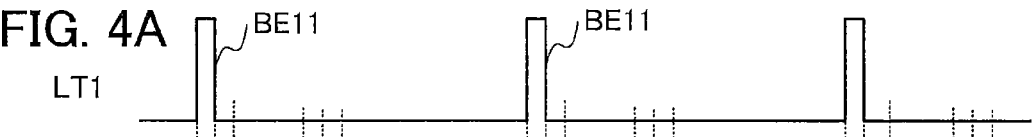
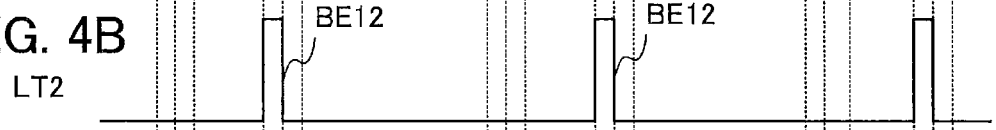
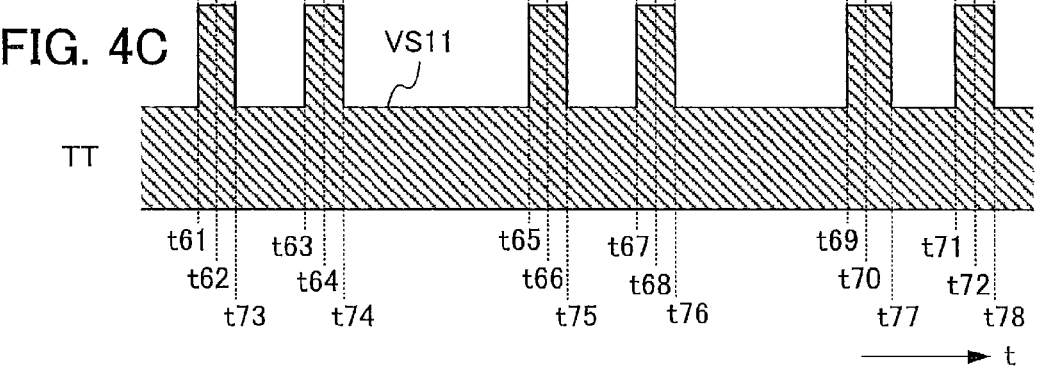

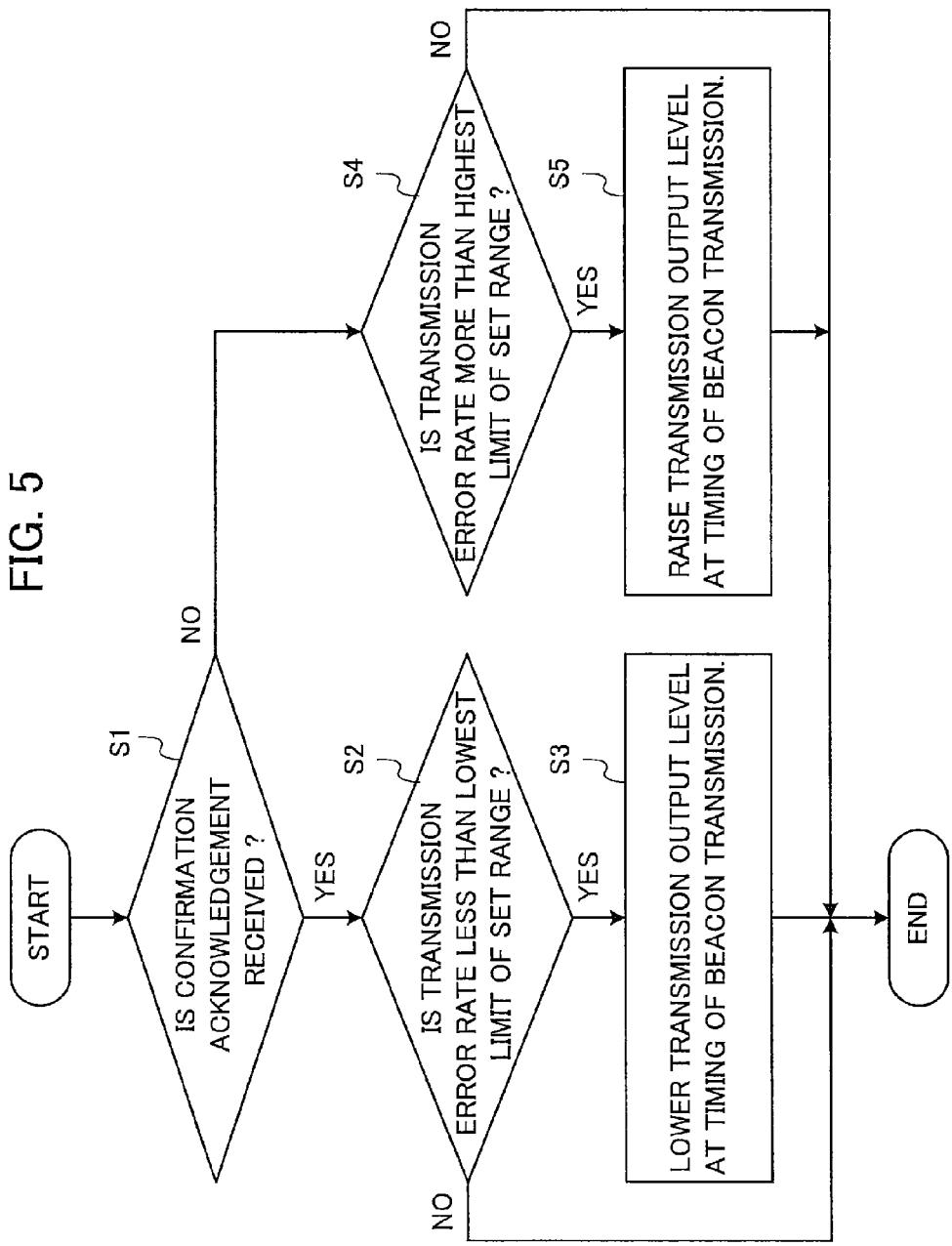

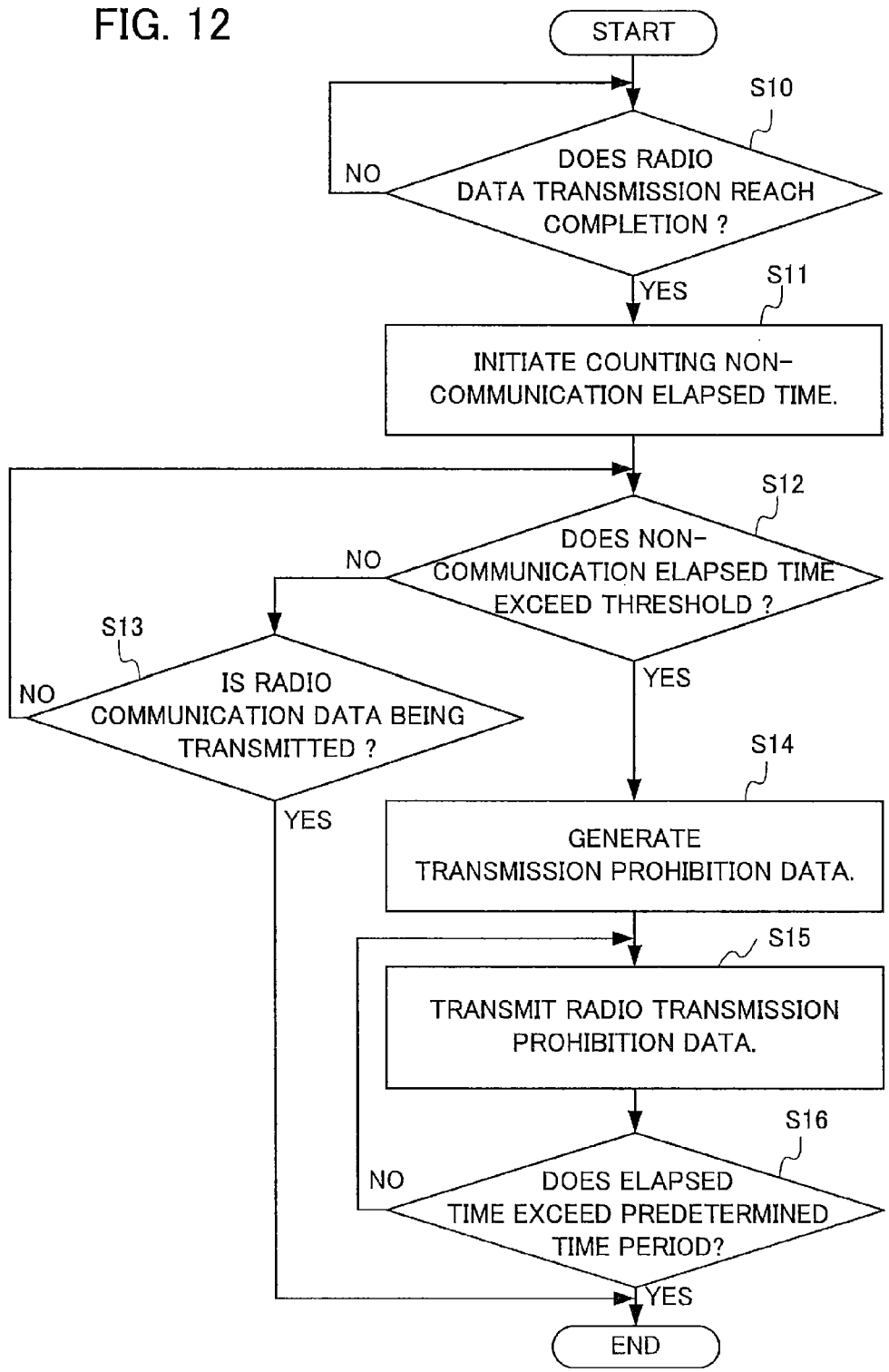

TIME

FIG. 14
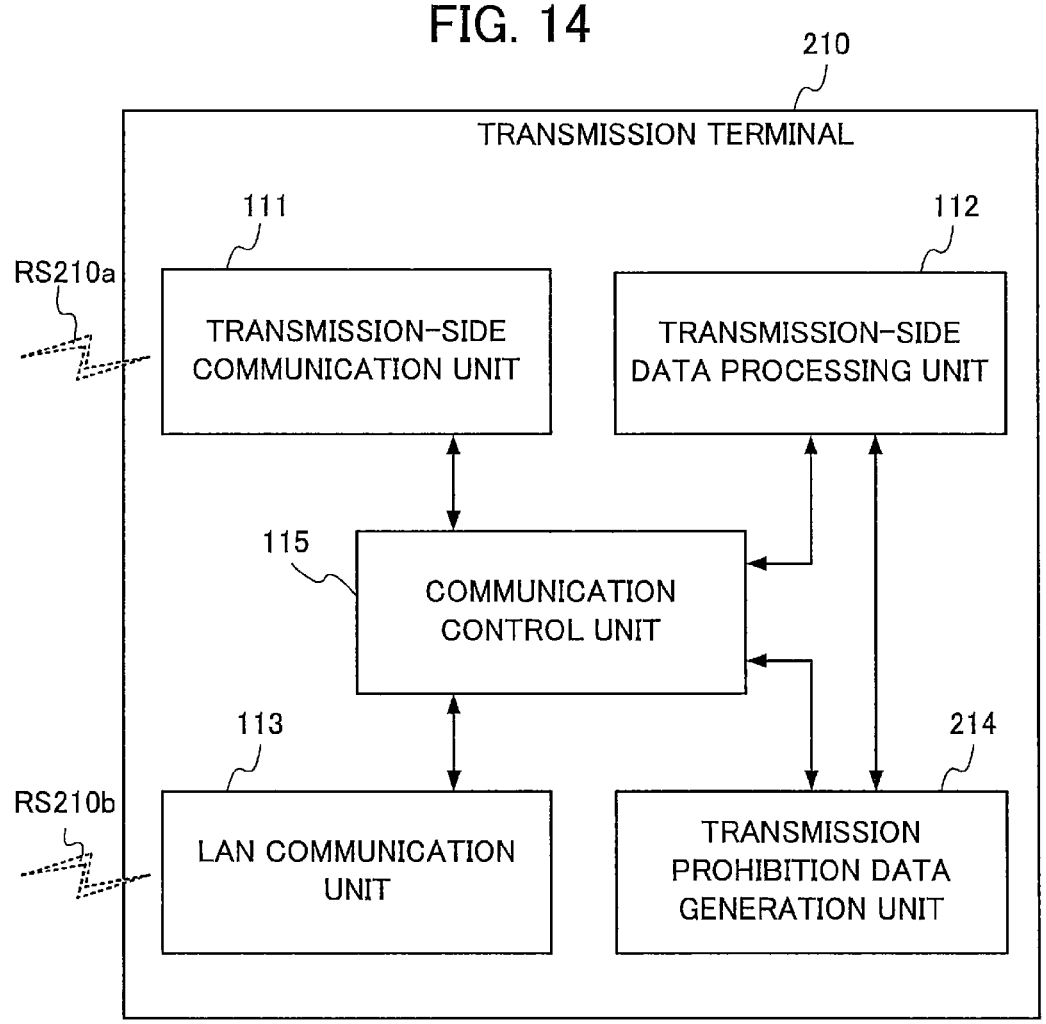
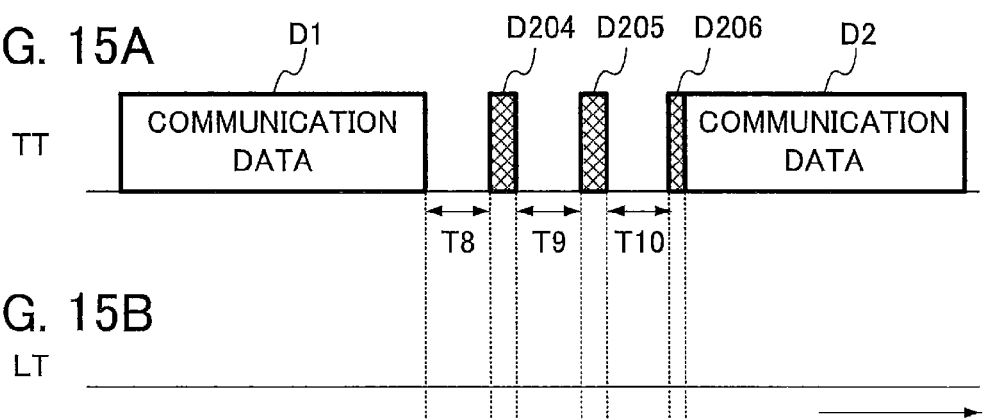
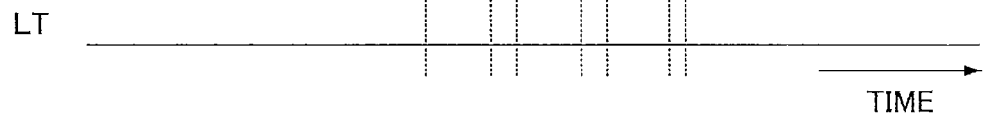

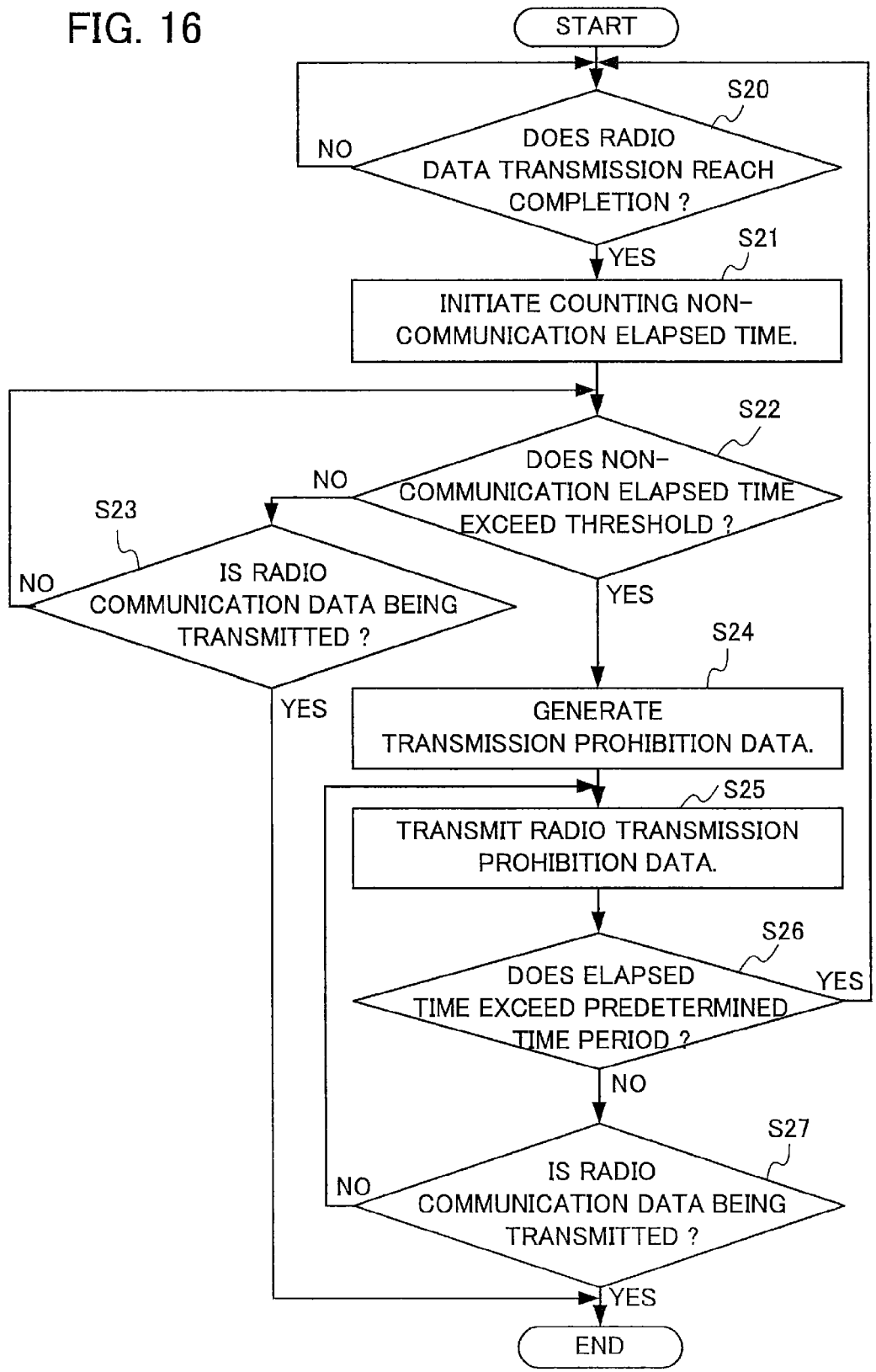

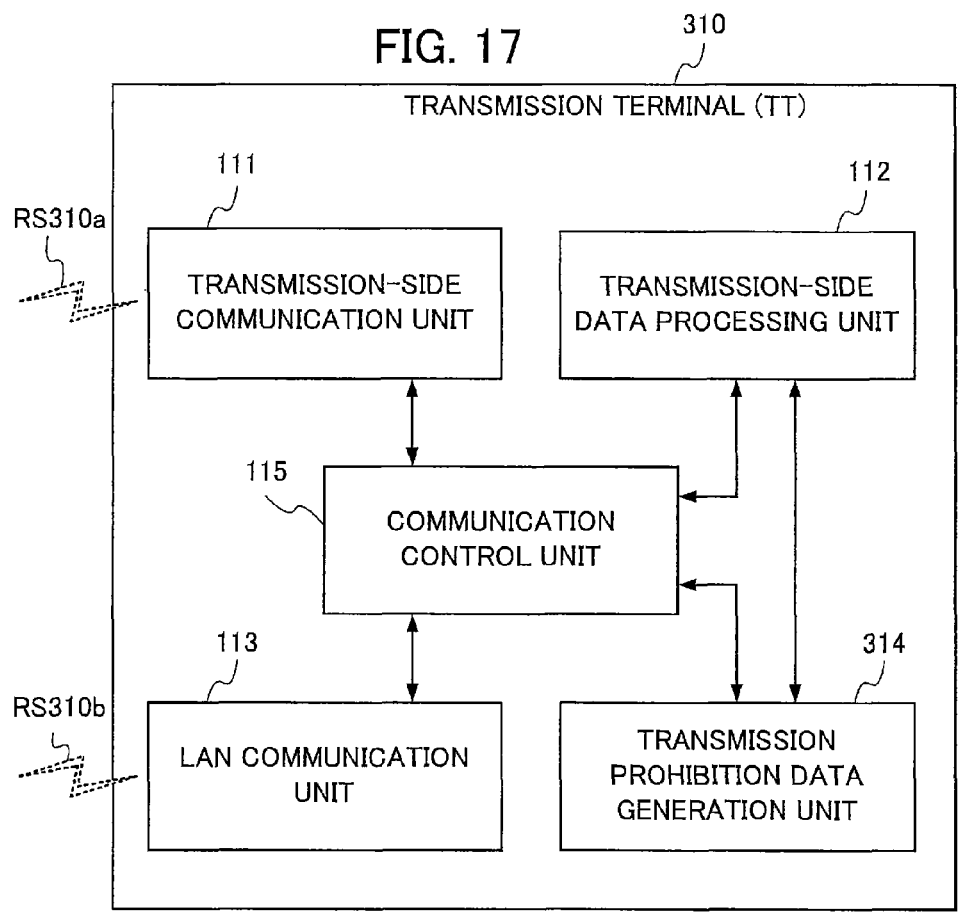
FIG. 17
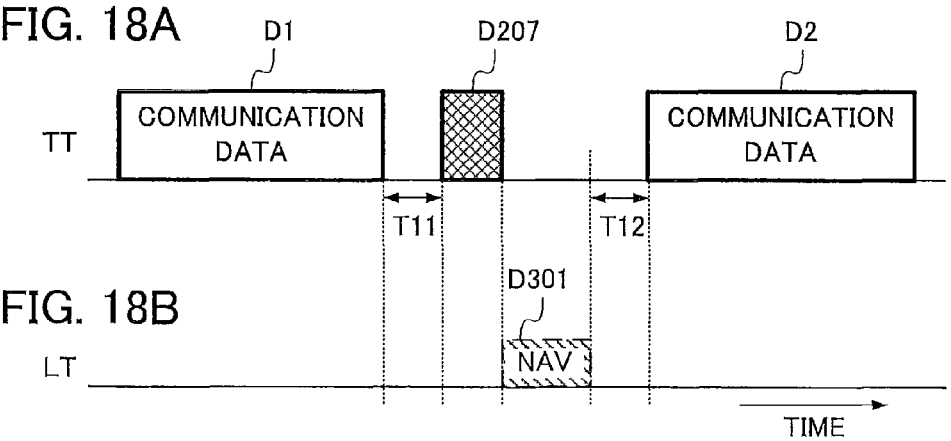
FIG. 18A
FIG. 18B

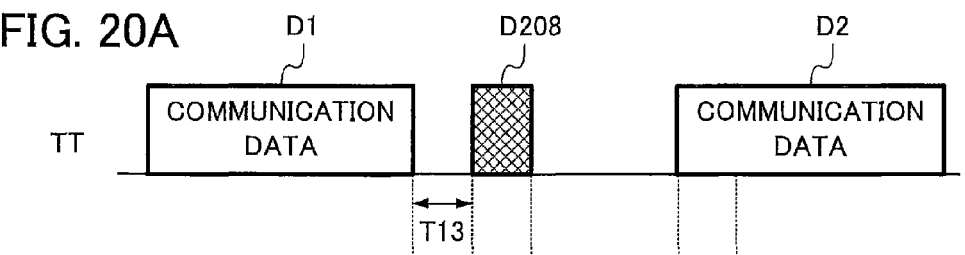
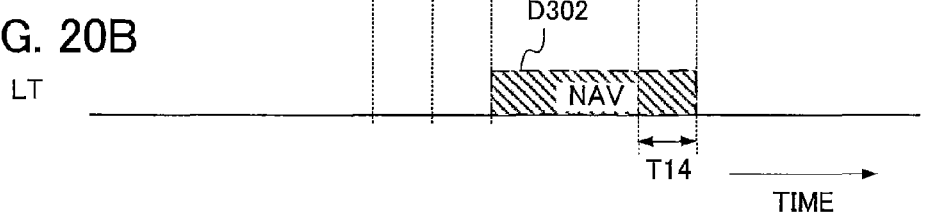
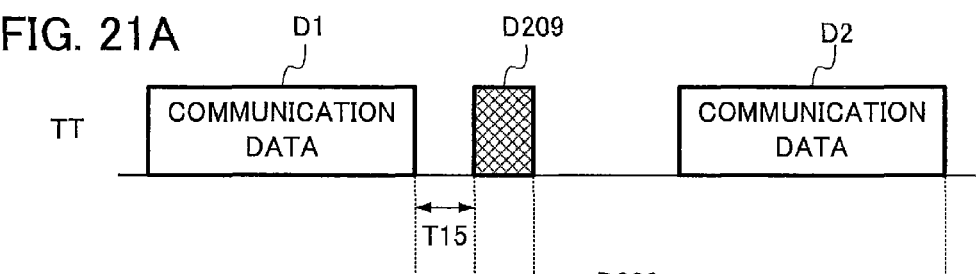
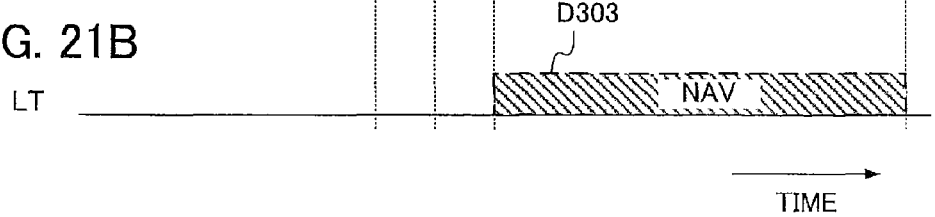

WIRELESS COMMUNICATION SYSTEM, TRANSMISSION TERMINAL, RECEPTION TERMINAL, AND TRANSMISSION METHOD

BACKGROUND OF THE INVENTION

1. Field of the Invention

The present invention relates to a wireless communication system for transmitting and receiving a radio signal, a transmission terminal and a reception terminal that form part of the wireless communication system, and a transmission method executed by a transmission terminal.

2. Description of the Related Art

Wireless communication systems have advantages of eliminating burdensome cabling that is required in wire network systems and providing flexible arrangement of terminals. Therefore, the wireless communication systems are now widespread for business use and household use.

Wireless communication systems conforming to the IEEE802.11a/b/g standards or the like, which are widespread as a wireless Local Area Network (LAN), use the Industrial Scientific and Medical (ISM) frequency band which is permitted to be used without a legally-required license. Therefore, a wireless terminal other than the LAN terminals can use the same frequency band as that used by the LAN terminals. However, in such conventional wireless communication systems, even if a plurality of wireless communication systems using the same frequency band coexist, countermeasures for the coexisting systems are not considered usually. Therefore, if a plurality of wireless communication systems using the same frequency band coexists within a common communication region, collisions between radio signals transmitted from the wireless communication systems occur frequently and interferences between radio communications also occur, which leads to occurrence of communication errors.

If the same kind of wireless communication terminals performing the same access control (e.g., wireless communication terminals belonging to the same wireless communication system) coexist within a common communication region, each of the wireless communication terminals analyzes a radio signal transmitted from the opposing terminal and adjusts transmission timings so as to minimize the likelihood of collisions between the radio signals. In contrast to this, if the different kind of wireless communication terminals which use different communication protocols (e.g., wireless communication terminals each belonging to different wireless communication systems) coexist within a common communication region, each of the wireless communication terminals does not adjust transmission timings for avoiding collisions between radio signals, thereby interference between the radio communications occurs.

One of countermeasures for avoiding collisions of radio signals is, for example, to select a radio frequency band, which makes the interference between radio communications less than a predetermined reference level. Concretely, when the wireless communication system is configured, the system measures a peripheral radio wave environment and selects a radio frequency band to be used on the basis of a result of the measuring so that the interference between radio communications becomes below a predetermined reference level. However, since the peripheral radio wave environment sometimes changes even after the wireless communication system has been configured, countermeasures for such change of the radio wave environment (e.g., the wireless communication system monitors the interference status of radio communications and adjusts the radio frequency band to be used on the basis of the result or the monitoring.) are necessary.

A wireless communication apparatus for avoiding mutual interference between wireless communications is disclosed in Japanese Patent Kokai Publication No. 2003-37529, for example. The wireless communication apparatus disclosed in this document tries to prevent the mutual interference between radio communications by interrupting the radio communication at a timing when an intensity of the radio signal received in the wireless communication system becomes higher than a predetermined reference intensity (e.g., when the apparatus determines that another wireless communication system perform a radio communication).

For example, in the case that the wireless communication system is a video transmission system which requires transmission of a radio video signal at specific timings, the video transmission system needs to transmit a radio video signal at specific timings even if a radio signal transmitted from another wireless communication system is detected. However if the video transmission system interrupts the radio communication if another wireless communication system initiates another radio communication in the similar manner to the conventional wireless communication apparatus disclosed in the above document for the purpose of avoiding the mutual interference between radio communications, a problem arises that the reliable radio transmission of the video signal cannot be implemented.

SUMMARY OF THE INVENTION

It is therefore an object of the present invention to provide a wireless communication system for transmitting and receiving a radio signal stably even if a plurality of wireless communication systems coexist within a common communication region, a transmission terminal and a reception terminal that form part of the wireless communication system, and a transmission method for transmitting a radio signal stably even if a plurality of wireless communication systems coexist within a common communication region.

According to an aspect of the present invention, a wireless communication system includes a transmission terminal for transmitting a radio signal; and a reception terminal for receiving the radio signal. The transmission terminal includes a transmission-side communication unit for transmitting the radio signal via a wireless communication network to the reception terminal; a transmission-side beacon reception unit for receiving a beacon signal, which is emitted periodically using at least partially the same radio frequency band as a radio frequency band used for transmitting the radio signal; a beacon analysis unit for analyzing the received beacon signal, thereby obtaining beacon period information indicating an emission time period of the received beacon signal and beacon reception time information indicating a reception time of the received beacon signal; and a transmission output level change unit for estimating an emission time period of a beacon signal to be received by the transmission-side beacon reception unit on the basis of the beacon period information and the beacon reception time information, thereby obtaining an estimated emission time period; wherein the transmission output level change unit instructs the transmission-side communication unit to transmit the radio signal having a raised transmission output level during at least the estimated emission time period, the raised transmission output level being higher than a transmission output level during a time period other than at least the estimated emission time period.

According to another aspect of the present invention, a wireless communication system includes a transmission terminal for transmitting a radio signal; and a reception terminal for receiving the radio signal. When the reception terminal receives a beacon signal, which is emitted periodically using at least partially the same radio frequency band as a radio frequency band used for transmitting the radio signal, the reception terminal transmits beacon reception state data including the received beacon signal and beacon reception time information indicating a time, at which the beacon signal is received by the reception terminal. When the transmission terminal receives the beacon reception state data transmitted from the reception terminal, the transmission terminal obtains the beacon reception time information and the beacon period information indicating an emission time period of the received beacon signal, and estimates an emission time period of a beacon signal to be received by the reception terminal on the basis of the beacon period information and the beacon reception time information, thereby obtaining an estimated emission time period; and the transmission terminal transmits the radio signal having a raised transmission output level during at least the estimated emission time period, the raised transmission output level being higher than a transmission output level during a time period other than at least the estimated emission time period.

According to an aspect of the present invention, a transmission terminal forming part of a wireless communication system, the wireless communication system including the transmission terminal for transmitting a radio signal and a reception terminal for receiving the radio signal; includes a transmission-side communication unit for transmitting the radio signal via a wireless communication network to the reception terminal; a transmission-side beacon reception unit for receiving a beacon signal, which is emitted periodically using at least partially the same radio frequency band as a radio frequency band used for transmitting the radio signal; a beacon analysis unit for analyzing the received beacon signal, thereby obtaining beacon period information indicating an emission time period of the received beacon signal and beacon reception time information indicating a reception time of the received beacon signal; and a transmission output level change unit for estimating an emission time period of a beacon signal to be received by the transmission-side beacon reception unit on the basis of the beacon period information and the beacon reception time information, thereby obtaining an estimated emission time period; wherein the transmission output level change unit instructs the transmission-side communication unit to transmit the radio signal having a raised transmission output level during at least the estimated emission time period, the raised transmission output level being higher than a transmission output level during a time period other than at least the estimated emission time period.

According to an aspect of the present invention, a reception terminal forming part of a wireless communication system, the wireless communication system including a transmission terminal for transmitting a radio signal and the reception terminal for receiving the radio signal; includes a reception-side communication unit for transmitting/receiving a radio signal via a wireless communication network to/from the transmission terminal; a reception-side beacon reception unit for receiving a beacon signal, which is emitted periodically using at least partially the same radio frequency band as a radio frequency band used for receiving the radio signal; and a beacon reception state data generation unit for generating beacon reception state data including the received beacon signal and beacon reception time information indicating a time, at which the beacon signal is received by the reception-side beacon reception unit; wherein when the reception-side beacon reception unit receives the beacon signal, the beacon reception state data generation unit causes the reception-side communication unit to transmit the beacon reception state data to the transmission terminal.

According to an aspect of the present invention, a transmission terminal includes a transmission-side data processing unit for generating communication data; a transmission prohibition data generation unit for generating transmission prohibition data for prohibiting a wireless terminal other than the transmission terminal from transmitting a radio signal; a communication unit for intermittently transmitting a first radio signal as radio communication data based on the generated communication data and a second radio signal as radio transmission prohibition data based on the generated transmission prohibition data; and a communication control unit for controlling the transmission-side data processing unit, the transmission prohibition data generation unit, and the communication unit so that: when the communication control unit causes the communication unit to transmit the radio communication data, the transmission prohibition data generation unit measures a non-communication elapsed time, during which the communication unit is not transmitting the radio communication data, and if the non-communication elapsed time exceeds a predetermined threshold, the communication control unit causes the communication unit to transmit the radio transmission prohibition data based on the generated transmission prohibition data using at least partially the same radio frequency band as a radio frequency band of the radio communication data.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A-3C are timing charts showing an example of timings of changing transmission output levels in the transmission terminal of FIG. 2;

FIGS. 4A-4C are timing charts showing another example of timings of changing transmission output levels in the transmission terminal of FIG. 2;

FIG. 5 is a flowchart showing processing of calculating a transmission output level in the transmission terminal of FIG. 2;

FIG. 12 is a flowchart showing processing of transmitting transmission prohibition data in a transmission terminal of FIG. 8;

FIG. 14 is a block diagram schematically illustrating a configuration of a transmission terminal in a wireless communication system according to a fourth embodiment;

FIGS. 15A and 15B are timing charts showing a case of the fourth embodiment in which no interference occurs between communication data transmitted by the transmission terminal and radio LAN data transmitted by the LAN terminal;

FIG. 16 is a flowchart showing processing of transmitting transmission prohibition data in the transmission terminal of FIG. 14;

FIG. 17 is a block diagram schematically illustrating a configuration of a transmission terminal in a wireless communication system according to a fifth embodiment;

FIGS. 18A and 18B are timing charts showing a case of the fifth embodiment in which no interference occurs between communication data transmitted by the transmission terminal and radio LAN data transmitted by the LAN terminal;

FIGS. 20A and 20B are timing charts showing another case of the fifth embodiment in which the transmission terminal of FIG. 17 transmits communication data and transmission prohibition data; and FIGS. 21A and 21B are timing charts showing another case of the fifth embodiment in which the transmission terminal of FIG. 17 transmits communication data and transmission prohibition data.

DETAILED DESCRIPTION OF THE INVENTION

Further scope of applicability of the present invention will become apparent from the detailed description given hereinafter. However, it should be understood that the detailed description and specific examples, while indicating preferred embodiments, of the invention, are given by way of illustration only, since various changes and modifications will become apparent to those skilled in the art from the detailed description.

First Embodiment

Figure 1:
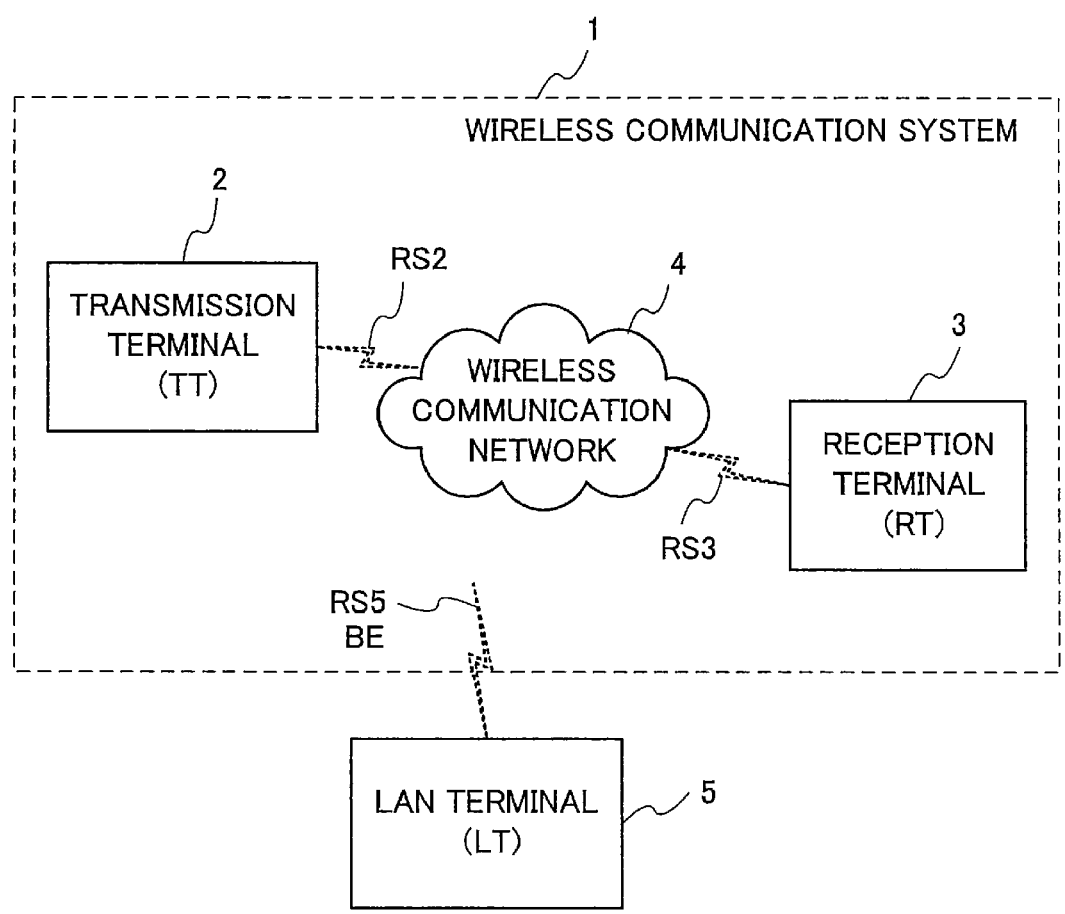
FIG. 1 is a block diagram schematically illustrating a configuration of a wireless communication system according to a first embodiment.

FIG. 1 is a block diagram schematically illustrating a configuration of a wireless communication system according to a first embodiment. Referring to FIG. 1, a wireless communication system 1 includes a transmission terminal (TT) 2 and a reception terminal (RT) 3. The transmission terminal 2 and the reception terminal 3 are configured so that they can radio-communicate with each other via a wireless communication network 4. The wireless communication network 4 may be a communication system which conforms to the known standard such as IEEE802.11 series, and it uses the same (or partially the same) radio frequency band as that used by a wireless LAN radio frequency band, for example. The transmission terminal 2 and the reception terminal 3 transmit/receive radio signals (e.g., RS2, RS3), which include a certain signal (e.g., a video signal) and any signals other than the certain signal using a predetermined radio frequency band, for example. In the first embodiment, the transmission terminal 2 is an apparatus which has a function of transmitting radio communication data such as a video signal, and the reception terminal 3 is an apparatus which has a function of receiving the radio communication data such as the video signal.

Further, a LAN terminal (LT) 5 is provided in a communication region, in which the transmission terminal 2 and the reception terminal 3 can radio-communicate (e.g., using a radio signal RS5) with a wireless terminal (not shown in the drawing). The LAN terminal 5 forms part of another wireless communication system (e.g., a wireless LAN system), in which radio communications are performed via a wireless LAN using the same (or partially the same) radio frequency band as that used by the wireless communication network 4. In order to radio-communicate with another LAN terminal in the wireless LAN system, the LAN terminal 5 periodically emits beacon signals BE at regular intervals. Concretely, the beacon signal is emitted periodically at the same (or partially the same) radio frequency band as that used in the wireless communication network 4, that is, at the same (or partially the same) radio frequency band as that used when the transmission terminal 2 transmits a video signal or the reception terminal 3 receives the video signal.

The beacon signal is a frame transmitted from the LAN terminal 5 at regular intervals. The beacon signal includes a Service Set Identifier (SSID) or a Basic Service Set Identification (BSSID) that indicates wireless LAN identification information, and also includes a Beacon Interval (BI) indicating an emission interval of the beacon signal (i.e., beacon period information).

Figure 2:
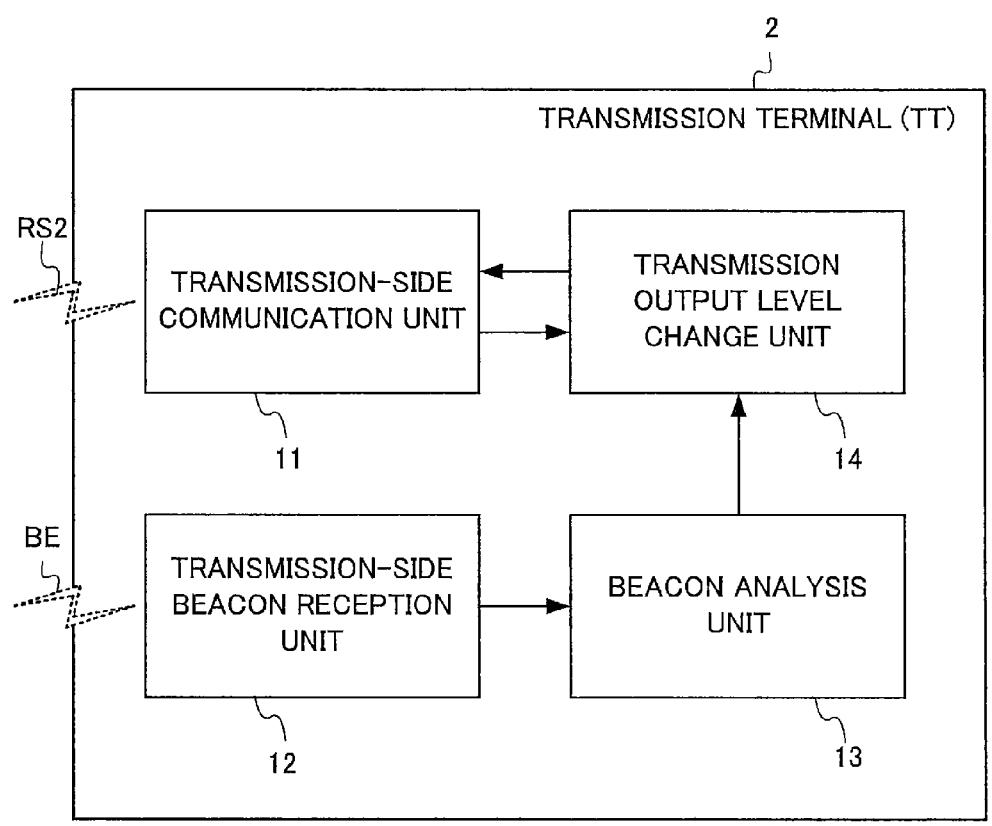
FIG. 2 is a block diagram schematically illustrating a configuration of a transmission terminal of FIG. 1.

FIG. 2 is a block diagram schematically illustrating a configuration of the transmission terminal (TT) 2. Referring to FIG. 2, the transmission terminal 2 includes a transmission-side communication unit 11, a transmission-side beacon reception unit 12, a beacon analysis unit 13, and a transmission output level change unit 14. The configuration of the transmission terminal 2 shown in FIG. 2 is just an example, and the transmission terminal 2 may have modified configuration.

The transmission-side communication unit 11 transmits/receives radio signals using a radio frequency band. For example, the transmission-side communication unit 11 transmits a video signal (video data) via the wireless communication network 4 to the reception terminal 3, and transmits/receives radio signals (other data) other than the video signal (video data). The transmission-side beacon reception unit 12 monitors a radio frequency band used when the transmission-side communication unit 11 transmits a video signal to the reception terminal 3, and receives a wireless LAN beacon signal transmitted from the LAN terminal 5. The transmission-side beacon reception unit 12 supplies the received beacon signal and beacon reception time information representing a reception time, at which the transmission-side beacon reception unit 12 received the beacon signal, to the beacon analysis unit 13.

The beacon analysis unit 13 analyzes the beacon signal supplied from the transmission-side beacon reception unit 12, and extracts the beacon period information included in the beacon signal. The beacon analysis unit 13 supplies the beacon reception time information supplied from the transmission-side beacon reception unit 12 and the beacon period information extracted from the beacon signal to the transmission output level change unit 14.

The transmission output level change unit 14 estimates an emission time period, during which a beacon signal is transmitted, on the basis of the beacon reception time information supplied from the transmission-side beacon reception unit 12 and the beacon period information extracted from the beacon signal. Further, the transmission output level change unit 14 calculates a timing (i.e., a transmission output level change timing), at which the transmission output level of a radio signal to be transmitted from the transmission-side communication unit 11 is changed, and a time period, during which the transmission output level is changed. At the calculated timing and during the calculated time period, the transmission output level change unit 14 supplies information (i.e., a transmission output level change instruction) representing an instruction for changing the transmission output level of the radio signal to be transmitted from the transmission-side communication unit 11, to the transmission-side communication unit 11.

When receiving the transmission output level change instruction from the transmission output level change unit 14, the transmission-side communication unit 11 changes the transmission output level of a radio signal to be transmitted at a timing and during a time period calculated by the transmission output level change unit 14 and transmits the radio signal, the transmission output level of which has been changed, via the wireless communication network 4 to the reception terminal 3. Through the above control, during a time period (i.e., an estimated emission time period) which is estimated to be an emission time period of the beacon signal, the transmission output level of the radio signal is changed, that is to say, the transmission output level of the radio signal is raised. Therefore, the radio signal has a raised transmission output level during the estimated emission time period and is transmitted from the transmission-side communication unit 11.

FIGS. 3A-3C are timing charts showing an example of timings of changing a transmission output level of a video signal VS1 transmitted via the wireless communication network from the transmission terminal (TT) 2. FIGS. 3A-3C shows a case where two LAN terminals (e.g., terminals LT1, LT2) are arranged in a communication region, in which the transmission terminal 2 and the reception terminal 3 can radio-communicate with each other. One of the LAN terminals (LT1, LT2) is the first LAN terminal (LT1), and the other is the second LAN terminal (LT2). The first LAN terminal (LT1) and the second LAN terminal (LT2) uses the same (or partially the same) radio frequency band as that used by the transmission terminal 2, and each of them emits a beacon signal (e.g., BE1, BE2), which interferes with the radio communication between the transmission terminal 2 and the reception terminal 3. In FIGS. 3A-3C, a horizontal axis indicates a time, and a vertical axis indicates an intensity (or a transmission output level) of the radio signal.

FIG. 3A shows emission timings of the first beacon signal BE1 output from the first LAN terminal (LT1). Referring to FIG. 3A, the first LAN terminal emits the first beacon signal BE1 during beacon emission periods t61-t62, t65-t66, and t69-t70, but emits no beacon signals during time periods other than the beacon emission periods t61-t62, t65-t66, and t69-t70.

FIG. 3B shows emission timings of the second beacon signal BE2 output from the second LAN terminal (LT2). Referring to FIG. 3B, the second LAN terminal emits the second beacon signal BE2 during beacon emission periods t63-t64, t67-t68, and t71-t72, but emits no beacon signals during time periods other than the beacon emission periods t63-t64, t67-t68, and t71-t72.

FIG. 3C shows a transmission output level of a radio signal such as a video signal transmitted from the transmission-side communication unit 11. Referring to FIG. 3C, during the beacon emission periods t61-t62, t63-t64, t65-t66, t67-t68, t69-t70, and t71-t72, a video signal having a raised transmission output level which is higher than the transmission output level during the time period other than the beacon emission periods is transmitted from the transmission-side communication unit 11.

As shown in FIG. 3A, the first LAN terminal emits the first beacon signals BE1 during the time periods t61-t62, t65-t66, and t69-t70. Further, as shown in FIG. 3B, the second LAN terminal emits the second beacon signals BE2 during the time periods t63-t64, t67-t68, and t71-t72.

In consideration of the first and second beacon signals BE1 and BE2 emitted at the timings shown in FIGS. 3A and 3B from the first and second LAN terminals, the transmission terminal 2 raises the transmission output level of the radio signal transmitted from the transmission-side communication unit 11 during the beacon emission periods t61-t62, t63-t64, t65-t66, t67-t68, t69-t70, and t71-t72 when the beacon signal BE1 or BE2 is emitted from the first or second LAN terminal.

FIGS. 4A-4C are timing charts showing another example of timings of changing transmission output level of a video signal VS11 transmitted via the wireless communication network from the transmission terminal (TT) 2. The timings in FIGS. 4A-4C that are the same as or correspond to the timings in FIGS. 3A-3C are assigned the same characters.

In the above-described FIGS. 3A-3C, the description has been made as to the case where the first and second beacon signals BE1 and BE2 are transmitted at predetermined emission timings. However, in general, emission timings in a wireless LAN may sometimes be delayed depending on current radio communication circumstances. For this reason, in FIGS. 4A-4C, time periods, during which the transmission output level is raised, are set to time periods t61-t73, t63-t74, . . . which are longer than the time periods t61-t62, t63-t64, . . . in FIGS. 3A-3C respectively. In other words, in FIGS. 4A-4C, each of the time periods t61-t73, t63-t74, . . . during which the transmission output level is raised, is set to a total time period of an estimated emission time period t61-t62 or t63-t64 . . . (during which the first and second LAN terminals are estimated to emit the beacon signals BE1 and BE2) and an estimated beacon delay time t62-t73 or t64-t74, . . . having a time length BD, (during which the transmission timing of the beacon signal BE1 or BE2 is estimated to be delayed).

For example, the delay period t62-t73 or t64-t74, . . . can be determined by measuring in advance the delay times when the beacon signal is emitted and setting the maximum of the measured delay times as a beacon delay time (BD) or by measuring in advance the delay times when the beacon signal is emitted and setting an average of the measured delay times as a beacon delay time (BD).

In the example shown in FIGS. 4A-4C, the time periods having a raised transmission output level are set to the time periods t63-t74, t65-t75, t67-t76, t69-t77, and t71-t78, which are the elongated time periods obtained by adding the above-described beacon delay time (BD) to each of the beacon emission periods t63-t64, t65-t66, t67-t68, t69-t70, and t71-t72 shown in FIGS. 3A-3C.

As described above, the timings, at which the transmission output level is lowered, are basically those (e.g., the timings t62, t64, . . . ) shown in FIGS. 3A-3C. However, the timings, at which the transmission output level is lowered, may be set to those (e.g., the timings t73, t74, . . . ) shown in FIGS. 4A-4C in consideration of the possible delay of beacon emission timing, at which the beacon signal is emitted.

FIG. 5 is a flowchart showing processing of calculating the transmission output level in the transmission terminal of FIG. 2. The processing at step 1 in FIG. 5 initiates when the transmission-side communication unit 11 transmits a radio signal having a raised transmission output level at the transmission-output change timing to the reception terminal 3. The processing in the transmission terminal 2 shown in FIG. 5 is performed repeatedly every time the transmission-side communication unit 11 transmits a radio signal such as a video signal VS1 or VS11 having the raised transmission output level at the transmission output level change timing.

At step S1, the transmission-side communication unit 11 determines whether or not it has received a confirmation acknowledgement signal transmitted from the reception terminal 3. The confirmation acknowledgement signal is a radio signal transmitted from the reception terminal 3 for notifying the transmission terminal 2 of a signal receipt when the reception terminal 3 receives a video signal VS1 or VS11 transmitted from the transmission-side communication unit 11 of the transmission terminal 2 via the wireless communication network 4.

The transmission-side communication unit 11 determines whether or not the reception terminal 3 receives a video signal VS1 or VS11 transmitted from the transmission-side communication unit 11 in a normal way, depending on whether or not the confirmation acknowledgement signal associated with the video signal VS1 or VS11 at the transmission output level change timing of the transmission-side communication unit 11 is received from the reception terminal 3.

When the transmission-side communication unit 11 determines that the confirmation acknowledgement signal has been received from the reception terminal 3 (YES at step S1), the transmission-side communication unit determines that the video signal VS1 or VS11 transmitted from the transmission-side communication unit 11 is received in a normal way by the reception terminal 3, and then the processing proceeds to step S2 for changing the transmission output level. When the transmission-side communication unit 11 determines that the confirmation acknowledgement signal has not been received from the reception terminal 3 (NO at step S1), it determines that the video signal VS1 or VS11 transmitted from the transmission-side communication unit 11 is not received by the reception terminal 3, i.e., a transmission error occurs, and then the processing proceeds to step S4 for changing the transmission output level of the video signal VS1 or VS11.

At step S2, the transmission output level change unit 14 determines whether or not the transmission error rate is lower than the lowest limit of a set range (i.e., an error rate range). The transmission error rate is an example of the transmission error rate information and indicates an occurrence frequency of the transmission errors of the radio signal having the raised transmission output level, which has been changed at the transmission output level change timing.

At step S2, when the transmission output level change unit 14 determines that the transmission error rate is less than the lowest limit of the set error rate range (YES at step S2), it determines that the normal radio signal transmission is possible even if the transmission output level is lowered and then the processing proceeds to step S3. On the other hand, at step S2, when the transmission output level change unit 14 determines that the transmission error rate is not less than the lowest limit of the set error rate range (i.e., when the transmission output level change unit 14 determines the transmission error rate is within the set error rate range) (NO at step S2), it determines that the current transmission output level is adequate and then the processing of calculating the transmission output level by the transmission terminal 2 is finished.

At step S3, the transmission output level change unit 14 supplies a transmission output level change instruction which instructs reduction of the transmission output level of the video signal VS1 or VS11 to be transmitted from the transmission-side communication unit 11, to the transmission-side communication unit 11 at the transmission output level change timing. The transmission-side communication unit 11 lowers the transmission output level of the video signal VS1 or VS11 to be transmitted from the transmission-side communication unit 11 on the basis of the transmission output level change instruction supplied from the transmission output level change unit 14 at the transmission output level change timing. The transmission-side communication unit 11 transmits the video signal VS1 or VS11 whose transmission output level is lowered, via the wireless communication network 4 to the reception terminal 3. After the processing at step S3 are finished, the processing of calculating the transmission output level in the transmission terminal 2 is finished.

At step S4, the transmission output level change unit 14 determines whether or not the transmission error rate is lower than the lowest limit of the set error rate range. At step S4, if the transmission output level change unit 14 determines that the transmission error rate exceeds the highest limit of the set error rate range, it determines that the normal radio signal transmission at the current transmission output level is impossible and then the processing proceeds to step S5. On the other hand, at step S4, if the transmission output level change unit 14 determines that the transmission error rate does not exceed the highest limit of the set error rate range, the processing of calculating the transmission output level is finished.

At step S5, the transmission output level change unit 14 supplies a transmission output level change instruction, which instructs the raise of the transmission output level of the video signal VS1 or VS11 to be transmitted from the transmission-side communication unit 11, to the transmission-side communication unit 11 at the transmission output level change timing. The transmission-side communication unit 11 raises the transmission output level of the video signal VS1 or VS11 to be transmitted from the transmission-side communication unit 11 on the basis of the transmission output level change instruction supplied from the transmission output level change unit 14 at the transmission output level change timing. The transmission-side communication unit 11 transmits the video signal VS1 or VS11 whose transmission output level is raised, via the wireless communication network 4 to the reception terminal 3. After the processing at step S5, the processing of calculating the transmission output level in the transmission terminal 2 is finished.

As described above, according to the first embodiment, the beacon signal using the same (or partially the same) radio frequency band as that used in the wireless communication system 1, is received by the transmission-side beacon reception unit 12 and analyzed by the beacon analysis unit 13, thereby obtaining the beacon period information. The transmission output level change unit 14 estimates the beacon emission period of the beacon signal on the basis of the beacon period information and the beacon reception time information. The transmission output level change unit 14 instructs the transmission-side communication unit 11 to transmit the video signal VS1 or VS11 having a raised transmission output level during the estimated emission time period.

In the wireless communication system 1 including the transmission terminal 2 and the reception terminal 3, even if the LAN terminal 5, which emits the beacon signal at the same (or partially the same) radio frequency band as that used for the radio communication exists, an adverse effect of interference resulting from the beacon signal emitted from the LAN terminal 5 can be reduced. For this reason, it becomes possible to stably transmit a video signal VS1 or VS11 from the transmission terminal 2 to the reception terminal 3, that is, transmit the video signal VS1 or VS11 with a stable quality.

Especially, as shown in FIGS. 4A-4C, in the case where each of the time periods of the raised transmission output level is set to a total period obtained by adding the above-described beacon delay time (during which the transmission timing of the beacon signal is estimated to be delayed) to each of the beacon emission periods t63-t64, t65-t66, . . . (during which the first and second LAN terminals are estimated to emit the beacon signal), an adverse effect of the interference with the beacon signal emitted from the LAN terminal 5 can be reduced. For this reason, it becomes possible to stably transmit the video signal VS1 or VS11 from the transmission terminal 2 to the reception terminal 3, that is, to transmit the video signal VS1 or VS11 with stable quality.

Furthermore, in the first embodiment, during the estimated emission time period when the LAN terminal 5 emits a beacon signal, the transmission terminal 1 determines the transmission output level of the video signal VS1 or VS11 on the basis of the transmission error rate of the radio signal transmitted at the transmission output level change timing. In this way, during a time period when the interference resulting from the beacon signal is enough low, the video signal VS1 or VS11 with a transmission output level that is not raised can be transmitted. In other words, the first embodiment can prevent unnecessary raised transmission output level of the radio signal.

Therefore, electric power consumption in the transmission terminal 2 can be reduced. Moreover, since the wireless network system according to the first embodiment can reduce the transmission signal that can reach further, a risk of interception of the transmission signal can be reduced.

In the above-described first embodiment, the description has been made as to the case where at step S1 in FIG. 5, a transmission error occurs when the transmission terminal 2 does not receive the confirmation acknowledgement signal transmitted from the reception terminal 3, that is, the signal does not transmitted in a normal way, the processing whether or not the transmission error occurs is not limited to the processing at step S1.

For example, the wireless communication system can be formed so that when the reception terminal 3 does not receive the video signal VS1 or VS11 normally transmitted from the transmission terminal 2, the reception terminal 3 transmits a negative confirmation acknowledgement signal that represents the video signal VS1 or VS11 has not been received normally, and when the transmission terminal 2 receives the negative confirmation acknowledgement signal transmitted from the reception terminal 3, it determines that a transmission error occurs. In this case, when the transmission terminal 2 determines that the negative confirmation acknowledgement signal is received, the processing proceeds to step S4. On the other hand, when the transmission terminal 2 determines that the negative confirmation acknowledgement signal is not received, it determines that the video signal VS1 or VS11 is normally received by the reception terminal 3 and the processing proceeds to step S2.

Second Embodiment

Figure 6:
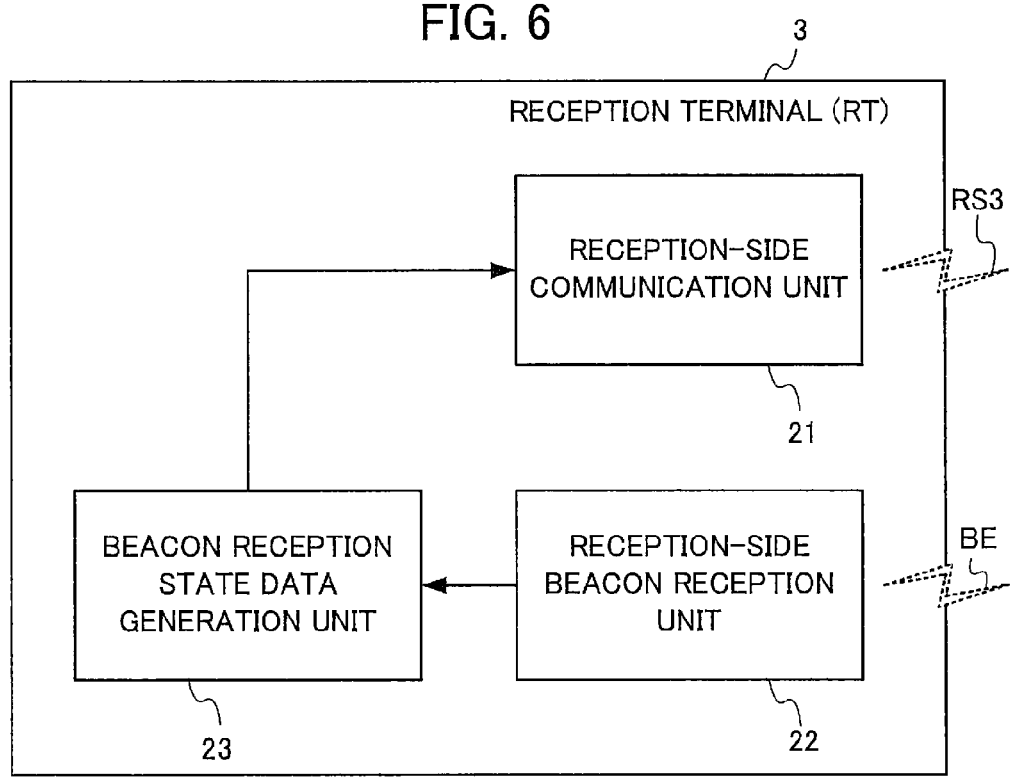
FIG. 6 is a block diagram schematically illustrating a configuration of a reception terminal forming part of a wireless communication system according to a second embodiment.

FIG. 6 is a block diagram schematically illustrating the reception terminal 3 forming part of a wireless communication system according to a second embodiment. The wireless communication system according to the second embodiment has a similar configuration to the wireless communication system 1 according to the first embodiment. The wireless communication system according to the second embodiment is different from the wireless communication system 1 according to the first embodiment in a respect of configurations of the transmission terminal (TT) and the reception terminal (RT).

Referring to FIG. 6, the reception terminal 3 according to the second embodiment includes a reception-side communication unit 21, a reception-side beacon reception unit 22, and a beacon reception state data generation unit 23. The reception-side communication unit 21, the reception-side beacon reception unit 22, and the beacon reception state data generation unit 23 shown in FIG. 6 are just examples, and these can be replaced by modified ones.

The reception-side communication unit 21 transmits below-described beacon reception state data via the wireless communication network 4 to the transmission terminal (30 in FIG. 7 corresponding to the terminal 2 in FIG. 1), and receives a video signal transmitted via the wireless communication network 4 from the transmission terminal (30 in FIG. 7). Furthermore, the reception-side communication unit 21 also transmits/receives signals (or data) other than the video signal (or video data) via the wireless communication network 4 to/from the transmission terminal (30 in FIG. 7).

The reception-side beacon reception unit 22 monitors a radio frequency band used when receiving the video signal transmitted from the transmission terminal (30 in FIG. 7), and receives the beacon signal emitted from the LAN terminals (e.g., the LAN terminals 5). The reception-side beacon reception unit 22 supplies the received beacon signal and the beacon reception time information indicating a time, at which the beacon signal is received, to the beacon reception state data generation unit 23.

The beacon reception state data generation unit 23 generates data (i.e., beacon reception state data) including the received beacon signal and the beacon reception time information supplied from the reception-side beacon reception unit 22. The beacon reception state data generation unit 23 supplies the generated beacon reception state data to the reception-side communication unit 21. The reception-side communication unit 21 transmits the beacon reception state data supplied from the beacon reception state data generation unit 23 via the wireless communication network 4 to the transmission terminal (30 in FIG. 7).

Figure 7:
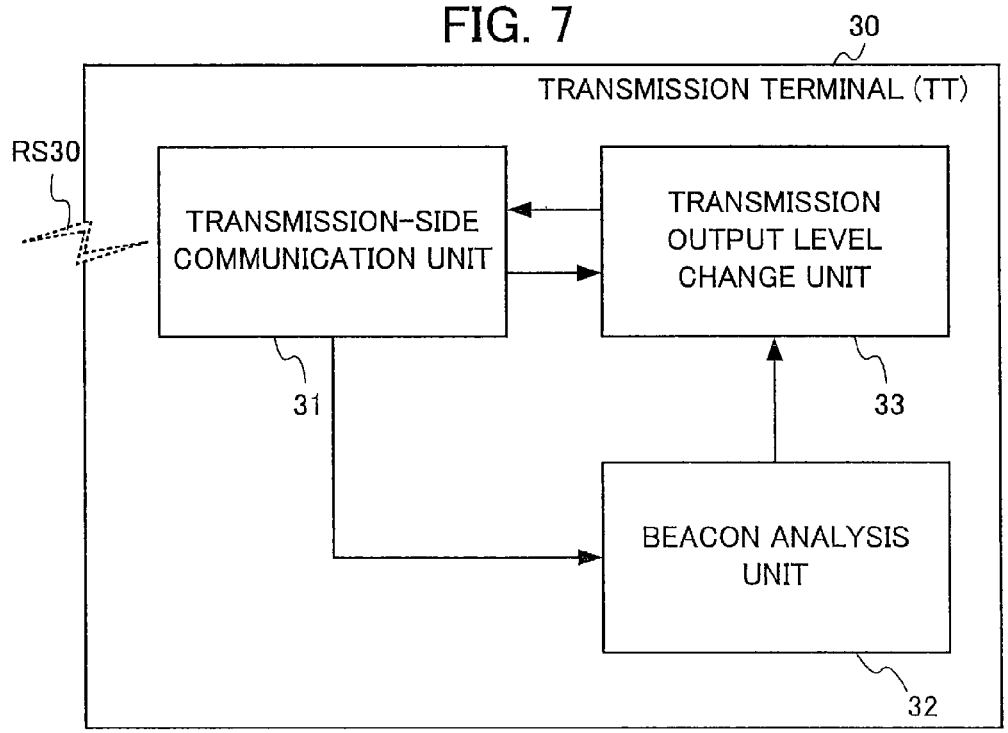
FIG. 7 is a block diagram schematically illustrating a configuration of a transmission terminal forming part of the wireless communication system according to the second embodiment.

FIG. 7 is a block diagram schematically illustrating a configuration of the transmission terminal 30 of the wireless communication system according to the second embodiment. The transmission terminal 30 in the second embodiment has a similar configuration to the transmission terminal 2 in the first embodiment, and therefore the description will be made with particular emphasis on different features. Referring to FIG. 7, the transmission terminal 30 includes a transmission-side communication unit 31, a beacon analysis unit 32, and a transmission output level change unit 33. The elements of the transmission terminal 30 shown in FIG. 7 are just examples, and these can be replaced by modified ones.

The transmission-side communication unit 31 transmits a video signal via the wireless communication network 4 to the reception terminal 3, and receives the beacon reception state data transmitted from the reception terminal 3. Further, the transmission-side communication unit 31 transmits/receives signals (or data) other than the video signal (or video data) via the wireless communication network 4 to/from the reception terminal 3. When receiving the beacon reception state data transmitted via the wireless communication network 4 from the reception terminal 3, the transmission-side communication unit 31 supplies the received beacon reception state data to the beacon analysis unit 32.

The beacon analysis unit 32 analyzes the beacon reception state data supplied from the transmission-side communication unit 31, extracts the beacon reception time information indicating a time, at which the reception-side communication unit 21 of the reception terminal 3 receives the beacon signal emitted from the LAN terminal 5, and the wireless LAN beacon period information included in the beacon signal, and supplies the extracted information to the transmission output level change unit 33.

The transmission output level change unit 33 estimates an emission time period, during which the beacon signal is emitted, thereby obtaining an estimated emission time period, and calculates a timing (i.e., a transmission output level change timing) and a time period when a transmission output level of the video signal to be transmitted from the transmission-side communication unit 31 on the basis of the wireless LAN beacon reception time and the wireless LAN beacon period information supplied from the beacon analysis unit 32. The transmission output level change unit 33 supplies the timing and the time period when the calculated transmission output level is to be changed, and a transmission output level change instruction indicating an instruction for changing the transmission output level of a radio signal to be transmitted from the transmission-side communication unit 31.

When the transmission output level change instruction is supplied from the transmission output level change unit 33, the transmission-side communication unit 31 changes the transmission output level of the video signal to be transmitted, and transmits the video signal whose transmission output level is changed, via the wireless communication network 4 to the reception terminal 3 at a timing and during a time period when the transmission output level calculated by the transmission output level change unit 33 is changed. In this way, during the estimated emission time period of the beacon signal, the transmission output level of the video signal is changed, i.e., concretely the transmission output level of the video signal is raised, and a radio signal having the raised transmission output level is transmitted from the transmission-side communication unit 11. Further, in the second embodiment, it is desirable that a time in the reception terminal 3 and a time in the transmission terminal 30 should be in synchronism with each other.

The timing and the time period when the transmission output level is raised and the processing of calculating the transmission output level in the transmission output level change unit 33 are similar to those in the first embodiment.

In the second embodiment, when the reception-side beacon reception unit 22 of the reception terminal 3 receives the beacon signal using the same (or partially the same) radio frequency band as that used by the wireless communication system, the beacon reception state data generation unit 23 generates the beacon reception state data including both the beacon signal and the beacon reception time information of the beacon signal and transmits the beacon reception state data as a radio signal to the transmission terminal 30.

The beacon reception state data are received by the transmission-side communication unit 31 of the transmission terminal 30 and is analyzed by the beacon analysis unit 32. Thereafter, the beacon reception time information and the beacon period information are extracted from the received beacon reception state data. On the basis of the beacon reception time information and the beacon period information, the transmission output level change unit 33 estimates an emission time period of the beacon signal. The transmission output level change unit 33 instructs the transmission-side communication unit 31 to transmit a video signal as a radio signal having a raised transmission output level during the estimated emission time period.

In the wireless communication system including the transmission terminal 30 and the reception terminal 3, even if a LAN terminal 5, which emits the beacon signal at the same (or partially the same) radio frequency band as that used for the radio communication exists, an adverse effect of interference with the beacon signal emitted from the LAN terminal 5 can be reduced. For this reason, it becomes possible to stably transmit the video signal as the radio signal from the transmission terminal 30 to the reception terminal 3, that is, to transmit the video signal with a stable quality.

Furthermore, in the second embodiment, in a similar manner to the first embodiment, during the estimated emission time period when the LAN terminal 5 emits the beacon signal, the transmission terminal 30 determines the transmission output level on the basis of a transmission error rate of the video signal transmitted at the transmission output level change timing. In this way, during a time period when the interference with the beacon signal is enough low, the video signal as a radio signal not having a raised transmission output level can be transmitted. In other words, the wireless communication system according to the second embodiment can prevent the transmission terminal 30 from transmitting the video signal as a radio signal having unnecessary raised transmission output level.

Therefore, electric power consumption in the transmission terminal 30 can be reduced. Moreover, since the wireless communication system according to the second embodiment can reduce the transmission signal that can reach further, a risk of interception of the transmission signal can be reduced.

As described above, in the second embodiment, the beacon reception time information of the beacon signal received by the reception terminal 3 and the beacon signal is supplied to the beacon reception state data generation unit 23, the beacon reception state data including the beacon reception time information and the beacon signal are generated, and transmitted by the reception-side communication unit 21 to the transmission terminal 30. However, the configuration of the second embodiment is not limited to the above-described example.

Further, in the modifications of the first and second embodiments, it is possible to modify the reception terminal 3 so that the reception terminal 3 analyzes the beacon signal and extracts the beacon period information, and transmits data including the beacon reception time information of the beacon signal and the wireless LAN beacon period information to the transmission terminal 30. In this case, the transmission terminal 30 receives the data including the beacon reception time information and the wireless LAN beacon period information transmitted from the reception terminal 3, and extracts the beacon reception time information of the beacon signal and the wireless LAN beacon period information from the received data, and supplies the extracted signal/information to the transmission output level change unit 33. The modified example described above also has advantageous effects that are similar to those of the first and second embodiments described above.

Third Embodiment

Figure 8:
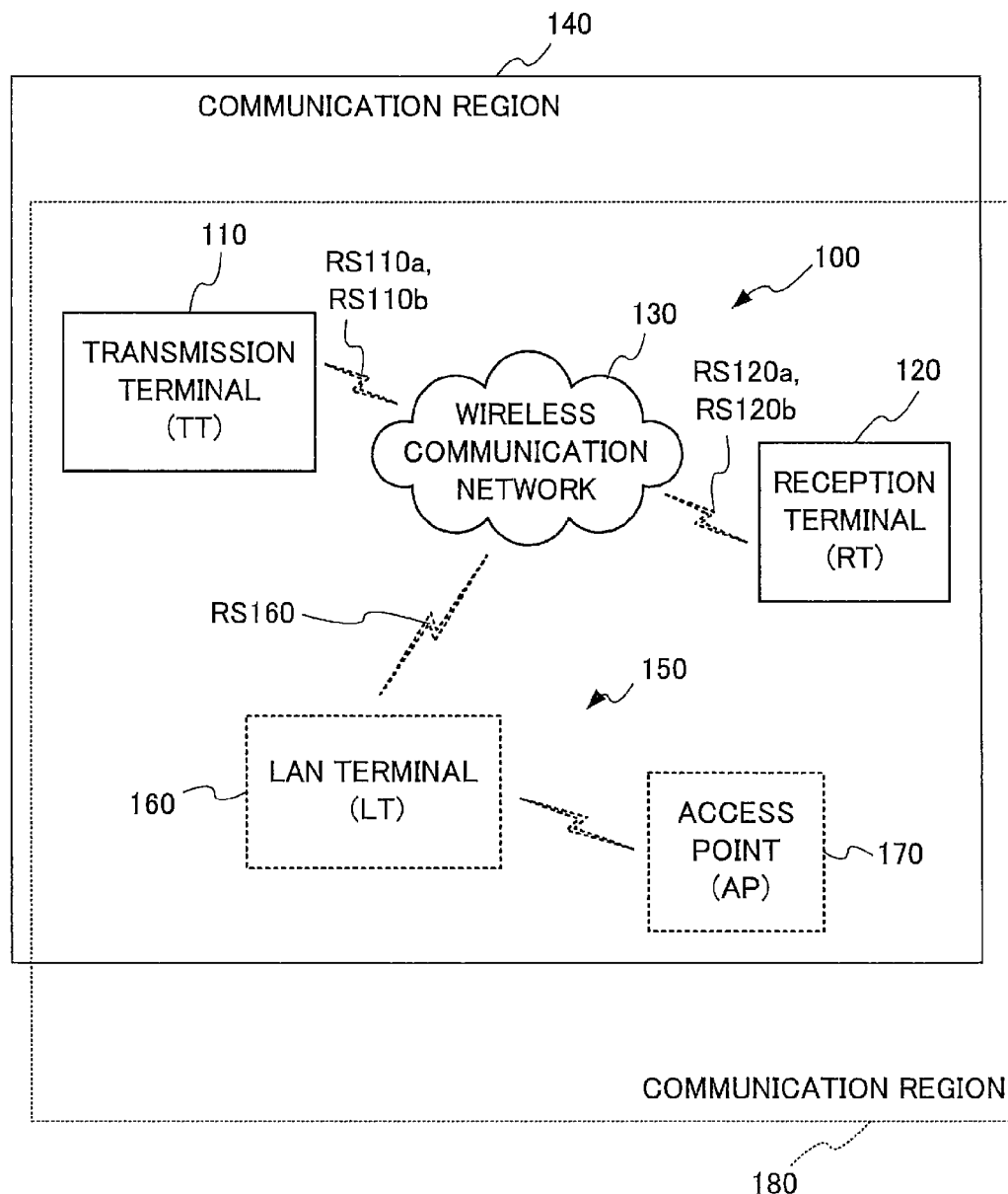
FIG. 8 is a block diagram schematically illustrating a configuration of a wireless communication system according to a third embodiment and a configuration of a wireless LAN system.

FIG. 8 is a block diagram schematically illustrating a configuration of a wireless communication system 100 according to a third embodiment and a configuration of a wireless LAN system 150. Referring to FIG. 8, the wireless communication system 100 includes a transmission terminal 110 and a reception terminal 120. These terminals have a function of radio-communicating (using radio signals RS110a, 110b, 120a, 120b) via the wireless communication network 130 with each other. In the third embodiment, the transmission terminal 110 transmits a video signal as a radio signal, the reception terminal 120 receives the video signal, and the transmission terminal 110 and the reception terminal 120 transmits/receives radio signals other than the video signal with each other.

The wireless LAN system 150 is another wireless communication system that is different from the wireless communication system 100 in a respect of a protocol in access control, and conforms to the IEEE802.11 standard, for example. In the third embodiment, a radio frequency band used by the wireless communication system 100 and a radio frequency band (e.g., of a radio signal RS160) used by the wireless LAN system 150 are at least partially overlapped or the same. Further, as shown in FIG. 8, a communication region 140 of the wireless communication system 100 and a communication region 180 of the wireless LAN system 150 are at least partially overlapped.

Figure 9:
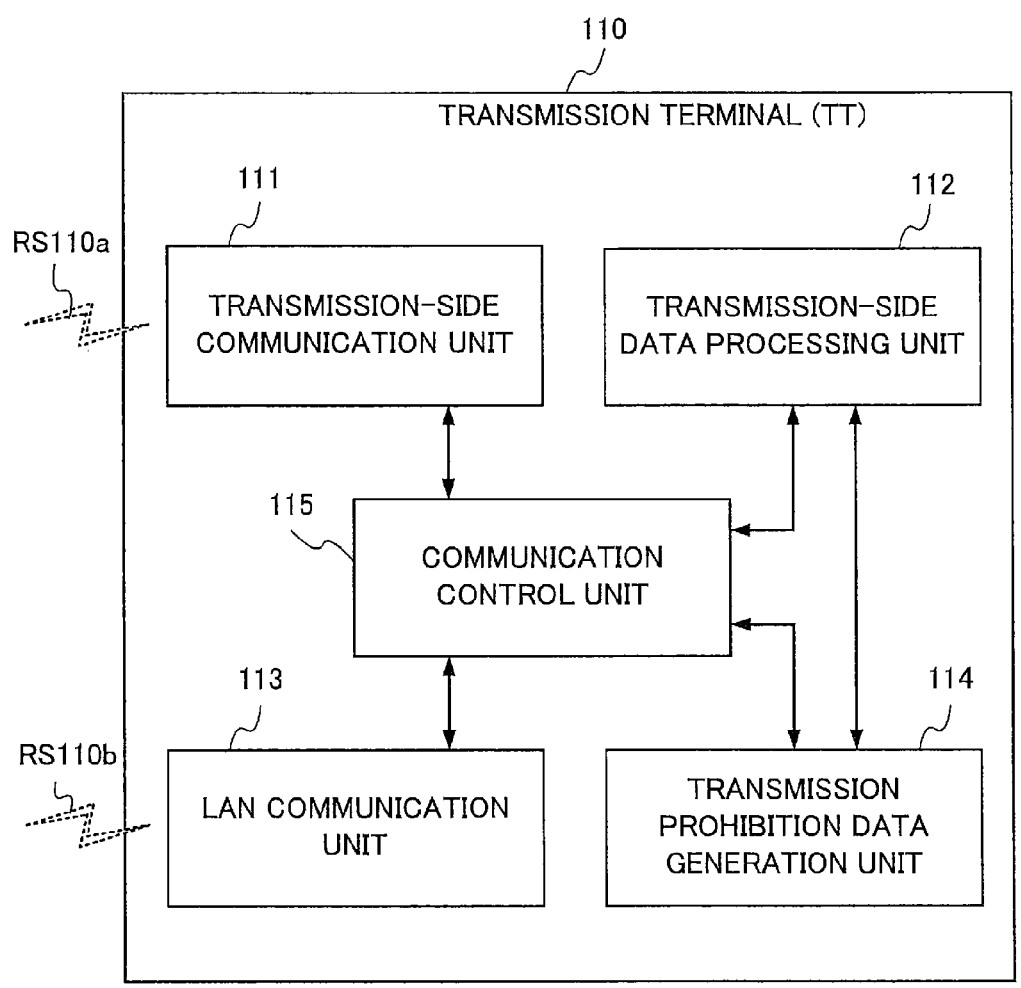
FIG. 9 is a block diagram schematically illustrating a configuration of a transmission terminal of FIG. 8.

FIG. 9 is a block diagram schematically illustrating a configuration of the transmission terminal (TT) 110. Referring to FIG. 9, the transmission terminal 110 includes a transmission-side communication unit 111, a transmission-side data processing unit 112, a LAN communication unit 113, a transmission prohibition data generation unit 114, and a communication control unit 115.

The transmission-side communication unit 111 performs a radio communication via the wireless communication network 130. The transmission-side communication unit 111 converts communication data such as video data to be transmitted to the reception terminal 120 into a radio signal (i.e., radio data) RS110a, and transmits the converted radio signal (i.e., radio communication data) via the wireless communication network 130 to the reception terminal 120, for example.

The transmission-side data processing unit 112 performs processing such as analysis of the data received by the transmission-side communication unit 111 and generates the communication data such as the video data to be transmitted from the transmission-side communication unit 111 to the reception terminal 120.

The LAN communication unit 113 converts the transmission prohibition data generated by the transmission prohibition data generation unit 114 to a radio signal (i.e., radio transmission prohibition data) RS110b with a frequency band used in the wireless LAN system 150, and transmits the radio transmission prohibition data RS110b.

The transmission prohibition data generation unit 114 monitors the transmission-side communication unit 111 via the communication control unit 115, and detects a non-communication elapsed time (i.e., an elapsed time from the initiation time of a non-communication time period), during which the radio communication data are not being transmitted by the transmission terminal 110. If the detected non-communication elapsed time exceeds a predetermined threshold, the transmission prohibition data generation unit 114 generates the transmission prohibition data for prohibiting the LAN terminal from performing a radio communication in the wireless LAN system 150. The transmission prohibition data generation unit 114 supplies the generated transmission prohibition data to the communication control unit 115, and causes the communication control unit 115 to supply the transmission prohibition data to the LAN communication unit 113.

The communication control unit 115 controls a radio communication performed by the transmission-side communication unit 111. The communication control unit 115 also controls a radio communication performed by the LAN communication unit 113. The transmission prohibition data generated by the transmission prohibition data generation unit 114 are supplied to the LAN communication unit 113, and the radio transmission prohibition data RS110b is transmitted from the LAN communication unit 113 at specific timings.

For example, the wireless LAN system 150 shown in FIG. 8 conforms to the IEEE802.11 standard, and includes a LAN terminal 160 and an access point (AP) 170. The LAN terminal 160 uses the Carrier Sense Multiple Access/Collision Avoidance (CSMA/CA) protocol as a protocol for controlling access to the AP 170. The CSMA/CA is an access control method, in which whether or not radio media is used for a time period longer than a predetermined reference time is determined before a LAN terminal initiates transmitting a radio signal, and if the radio media is not used for the time period, a radio signal transmission is initiated.

Figure 10A:
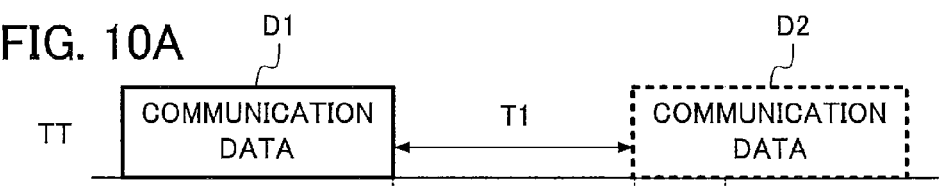
FIGS. 10A and 10B are timing charts showing a case where interference occurs between communication data transmitted by the transmission terminal and radio LAN data transmitted by the LAN terminal.
Figure 10B:
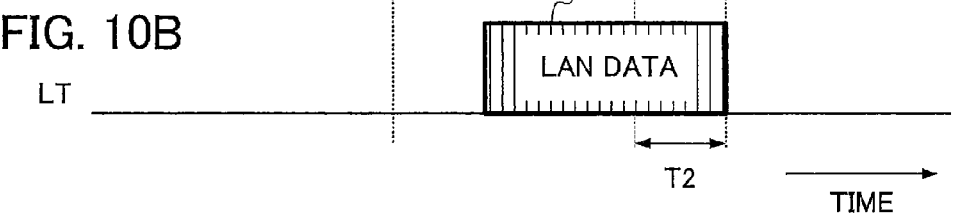

FIGS. 10A and 10B are timing charts showing a case where interference occurs between radio communication data D2 transmitted by the transmission terminal (TT) 110 according to the third embodiment and radio LAN data D101 transmitted by a LAN terminal (LT) 160. As described above, if a radio frequency band used by the wireless communication system 100 and a radio frequency band used by the wireless LAN system 150 are at least partially overlapped or the same, as shown in FIGS. 10A and 10B as a time period T2, the radio communication data transmitted from the transmission terminal 110 and the radio LAN data transmitted from the LAN terminal 160 may occasionally interferes with each other. For example, referring to FIG. 10A, the transmission terminal 110 transmits the radio communication data (e.g., video data) D1, D2 at regular intervals. In FIGS. 10A and 10B, the regular interval is a non-communication time period T1, during which no radio communication data are transmitted/received by the transmission terminal 110.

On the other hand, for example, the LAN terminal 160 conforming to the IEEE802.11 standard initiates the radio communication after its confirmation that no other radio communication exists during the DCF Inter Frame Space (DIFS) time by the carrier sensing has been made and a random backoff time has been elapsed. Therefore, if the non-communication time period T1 of the transmission terminal 110 is longer than the DIFS time period, the LAN terminal 160 undesirably initiates the radio communication in some cases. In such case, the radio communication data D2 transmitted from the transmission terminal 110 and another radio signal of the LAN terminal 160 transmitted from the radio LAN data D101 are overlapped during a time period T2, and these radio signals are interfered with each other.

For example, when the transmission terminal 110 transmits radio communication data in uncompressed 1080 p video format in the form of radio video data, a Vertical Blanking Interval (VBI) of the video data is approximately 666 μs. When the transmission terminal 110 transmits the radio communication data at the same timing as a timing, at which the video data are generated, no communication data are transmitted during a time period corresponding to the blanking period, and therefore a non-communication time period appears.

In contrast to this, in the IEEE802.11a standard which is one of the wireless LAN standards, there is a stipulation that the DIFS time period is 34 μs.

Therefore, the above-described non-communication time period of the radio signal when the video data are transmitted is longer than the DIFS time period.

For this reason, in some cases, the LAN terminal 160 undesirably initiates the radio communication during the non-communication time period T1, and the radio communication data D2 that are transmitted at the next timing is overlapped on the transmission time period of the radio LAN data D101. In such case, the transmission terminal 110 cannot transmit the radio communication data D2 at specific timing.

Figure 11A:
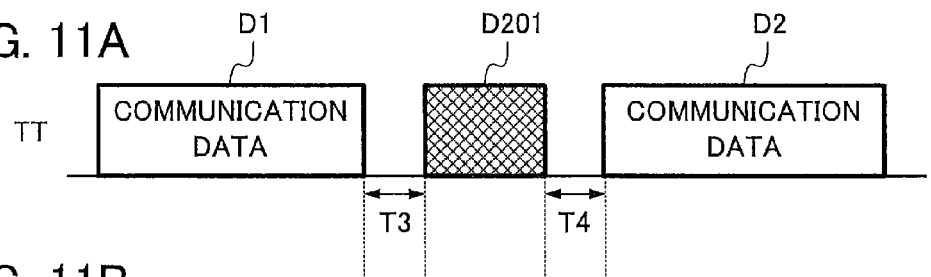
FIGS. 11A and 11B are timing charts showing a case of the third embodiment in which no interference occurs between communication data transmitted by the transmission terminal and radio LAN data transmitted by the LAN terminal.
Figure 11B:
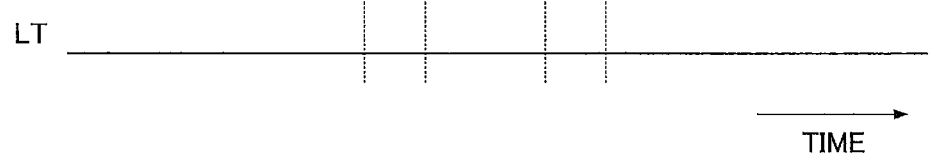

FIGS. 11A and 11B are timing charts showing a case of the third embodiment in which no interference occurs between the communication data D1, D2 transmitted by the transmission terminal (TT) 110 and the radio LAN data (no radio LAN data in this case) transmitted by the LAN terminal (LT) 160. As shown in FIGS. 11A and 11B, the transmission terminal 110 transmits radio transmission prohibition data D201 in an interval between the radio communication data D1, D2. Further, the transmission terminal 110 controls transmission of the radio communication data so that each of a non-communication time period T3 between the completion of transmission of the radio communication data D1 and the initiation time of transmission of the radio transmission prohibition data D201 and a non-communication time period T4 between the completion of transmission of the radio transmission prohibition data D201 and the initiation time of transmission of the radio communication data D2 is shorter than a time period which is required for initiating transmission of the radio LAN data by the LAN terminal 160. In this way, while the transmission terminal 110 transmits the radio communication data such as video data that are required to be transmitted at predetermined timings, the transmission terminal 110 can prohibit the LAN terminal 160 from transmitting the radio LAN data, by emitting the radio transmission prohibition data D201.

For example, the LAN terminal 160 conforming to the IEEE802.11 standard confirms that no other radio communication is performed in a channel used by the LAN terminal 160 by carrier sensing for the DIFS time period when initiating a radio communication, and the LAN terminal 160 waits for a random back off after the DIFS time period has been elapsed. For this reason, by emitting the radio transmission prohibition data so that each of the non-communication time periods T3 and T4 is not longer than the DIFS time period, the transmission terminal 110 can prohibit the LAN terminal or terminals from initiating a radio communication.

FIG. 12 is a flowchart showing processing of the transmission terminal 110 for transmitting the radio transmission prohibition data.

First, the transmission prohibition data generation unit 114 monitors the transmission-side communication unit 111 via the communication control unit 115, and determines whether a radio signal transmission from the transmission-side communication unit 111 reaches completion or not (step S10). If the determination is that the radio signal transmission from the transmission-side communication unit 111 reached completion (YES at step S10), the processing proceeds to step S11. The determination is that the radio signal transmission from the transmission-side communication unit 111 reached completion, for example,
(i) when the communication control unit 115 receives a success reply indicating that the reception terminal has normally received the radio communication data (D1 or D2 or . . . ) from the transmission-side communication unit 111, or
(ii) when the communication control unit 115 detects that the communication data to be transmitted stored in a transmission buffer of the transmission-side communication unit 111 is exhausted, or
(iii) when the communication control unit 115 stops power supply for signal transmission to be supplied the transmission-side communication unit 111, or
(iv) when the communication control unit 115 becomes incapable of detecting a transmitted from the transmission-side communication unit 111, or
(v) another timing which can be detected by the communication control unit 115.

Next, at step S11, the transmission prohibition data generation unit 114 initiates measuring (e.g., initiates counting) a non-communication elapsed time from the completion of transmission of the radio communication data from the transmission-side communication unit 111.

Next, at step S12, the transmission prohibition data generation unit 114 determines whether or not the non-communication elapsed time exceeds a predetermined threshold. If the non-communication elapsed time does not exceed the predetermined threshold (NO at step S12), the processing proceeds to step S13, and if the non-communication elapsed time exceeds the predetermined threshold (YES at step S12), the processing proceeds to step S14. The predetermined threshold is the DIFS time period, for example.

At step S13, the transmission prohibition data generation unit 114 monitors the transmission-side communication unit 111 via the communication control unit 115, and determines whether or not the transmission-side communication unit 111 is transmitting the radio communication data on the basis of a result of the monitoring. The transmission prohibition data generation unit 114 terminates the processing if the transmission-side communication unit 111 is transmitting the radio communication data (YES at step S13). On the other hand, the transmission prohibition data generation unit 114 returns the processing to step S12 and repeats the processing of step S12 if the transmission-side communication unit 111 is not transmitting the radio communication data (NO at step S13).

The radio signal transmission by the transmission-side communication unit 111 is initiated, for example,
(i) when the communication control unit 115 outputs the communication data to be transmitted to the transmission-side communication unit 111, or
(ii) when the communication control unit 115 supplies electric power for transmission to the transmission-side communication unit 111, or
(iii) when the communication control unit 115 detects a radio signal transmitted from the transmission-side communication unit 111, or
(iv) another time which can be detected by the communication control unit 115.

Next, the transmission prohibition data generation unit 114 generates the transmission prohibition data (step S14). The transmission prohibition data may be, for example, predetermined data to be transmitted, a destination of which is a predetermined communication address.

The predetermined data used as the transmission prohibition data may be, for example, a communication frame which is used by the wireless LAN system 150 and contains dummy data. The dummy data of the communication frame may be either specific value data or random value data, for example. Furthermore, the communication address as the designation may be, for example, a communication address of the transmission terminal 110, or a communication address of an imaginary wireless LAN terminal other than the LAN terminal 160 and the AP 170, or a multicast communication address in the wireless LAN system 150, or the like.

Next, the transmission prohibition data generation unit 114 supplies the transmission prohibition data generated at step S14 and the communication address indicating a designation of the transmission prohibition data to the communication control unit 115. The communication control unit 115 that has received the transmission prohibition data and the communication address causes the wireless LAN communication unit 113 to transmit the radio transmission prohibition data to the received communication address (step S15).

Next, the transmission prohibition data generation unit 114 determines whether or not the transmission prohibition data generated at step S14 have been transmitted for the predetermined time period, during which a radio communication of the LAN terminal 160 is prohibited, that is, whether or not the elapsed time from the initiation time of a non-communication time period exceeds the predetermined time period (step S16).

The transmission prohibition data generation unit 114 terminates the processing of transmission of the radio transmission prohibition data if the radio transmission prohibition data have been transmitted for the predetermined time period (i.e., if the elapsed time does not exceed the predetermined time period) (YES at step S16). On the other hand, the transmission prohibition data generation unit 114 returns the processing to step S15 to continue transmitting the radio transmission prohibition data if the radio transmission prohibition data has not been transmitted for the predetermined time period (i.e., if the elapsed time exceeds the predetermined time period) (NO at step S16).

In the third embodiment, the predetermined time period may be set to a value obtained by subtracting the non-communication time period T3 and the non-communication time period T4 from a transmission interval (which is not shorter than the DIFS time period) between the radio communication data D1, D2 transmitted from the transmission-side communication unit 111, for example. The predetermined time period is, for example, set to a value obtained by subtracting the DIFS time period multiplied by two from the transmission interval between the radio communication data D1, D2.

For example, as described above, if the uncompressed video data of the 1080 p video format are transmitted as the communication data from the transmission-side communication unit 111, the Vertical Blanking Interval (VBI) is used as the transmission interval between the radio communication data D1, D2 when the predetermined time period is calculated.

As described above, in the third embodiment, when a non-communication elapsed time, during which the transmission terminal 110 transmits no radio communication data such as video data, exceeds the predetermined threshold, the radio transmission prohibition data are transmitted. In this way, during a non-communication time period, the LAN terminal 160 conforming to the IEEE802.11 standard using the same radio frequency band is not allowed to initiate a radio communication. Therefore, the transmission terminal 110 can transmit the radio communication data such as video data without causing the interference between radio communications, thereby implementing a stable radio communication of the video data.

Further, in the third embodiment, the description has been made as to the case where another wireless communication system having the probability of interfering with the radio signal of the wireless communication system 100 is the wireless LAN system 150 conforming to the IEEE802.11 standard. However, another wireless communication system is not limited to this example and may be a wireless communication system performing access control using other methods such as a CSMA/CA method. In this case, the similar advantageous effects to those in the third embodiment can be obtained by the similar method.

Figure 13A:
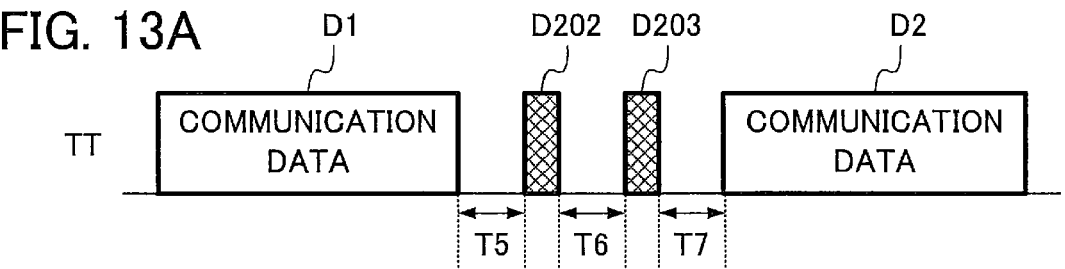
FIGS. 13A and 13B are timing charts showing another case of the third embodiment in which no interference occurs between communication data transmitted by the transmission terminal and radio LAN data transmitted by the LAN terminal.
Figure 13B:
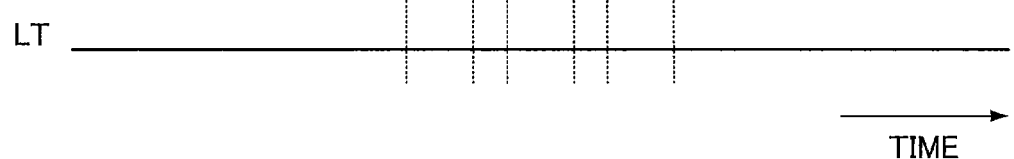

Furthermore, in the third embodiment, the description has been made as to the case where the radio transmission prohibition data are being transmitted for the predetermined time period at steps S15 and S16, but the communication system is not limited to this example. For example, as shown in FIGS. 13A and 13B, it is possible to transmit a plurality items (e.g., divided data items) of transmission prohibition data D202, D203 for the predetermined time period so that (i) a non-communication time period T6 between the radio transmission prohibition data D202, SD203 becomes not more than the DIFS time period, and (ii) a non-communication time period T5 between the radio communication data D1 and the radio transmission prohibition data D202 becomes not more than the DIFS time period, and (iii) a non-communication time period T7 between the transmission prohibition data D203 and the communication data D2 becomes not more than the DIFS time period.

Fourth Embodiment

FIG. 14 is a block diagram schematically illustrating a configuration of a transmission terminal 210 of a wireless communication system according to a fourth embodiment. Elements in FIG. 14 that are the same as or correspond to those in FIG. 9 are assigned the same characters. The fourth embodiment is different from the above-described third embodiment in a respect of the transmission terminal 210. Therefore, a description will be made with particular emphasis on different features such as the transmission terminal 210 and its related matters.

Referring to FIG. 14, the transmission terminal 210 includes the transmission-side communication unit 111, the transmission-side data processing unit 112, the LAN communication unit 113, a transmission prohibition data generation unit 214, and the communication control unit 115. The transmission terminal 210 according to the fourth embodiment is different from the transmission terminal 110 according to the third embodiment in a respect of the transmission prohibition data generation unit 214. Therefore, a description will be made with particular emphasis on different features such as the transmission prohibition data generation unit 214 and its related matters.

The transmission prohibition data generation unit 214 monitors the transmission-side communication unit 111 and the LAN communication unit 113 via the communication control unit 115, and detects a non-communication elapsed time, during which the transmission terminal 110 is not transmitting the radio communication data from the transmission-side communication unit 111 or the LAN communication unit 113. If the detected non-communication elapsed time exceeds a predetermined threshold, the transmission prohibition data generation unit 214 generates the transmission prohibition data for prohibiting radio communications of LAN terminals via the wireless LAN system 150. The transmission prohibition data generation unit 214 supplies the generated transmission prohibition data to the communication control unit 115. The communication control unit 115 supplies the transmission prohibition data to the LAN communication unit 113, and causes the LAN communication unit 113 to transmit a radio signal of the transmission prohibition data (i.e., radio transmission prohibition data).

Further, the transmission prohibition data generation unit 214 generates the transmission prohibition data intermittently so that each of the non-communication time periods (e.g., T8, T9, T10 in FIG. 15A) of the radio signal from the transmission terminal 210 is not longer than a predetermined time period (e.g., the DIFS time period), and transmits the radio transmission prohibition data (e.g., D204, D205, D206 in FIG. 15A) intermittently via the communication control unit 115 and the LAN communication unit 113. Furthermore, when detecting via the communication control unit 115 the initiation time of transmission of the radio communication data from the transmission-side communication unit 111 or the LAN communication unit 113, the transmission prohibition data generation unit 214 stops generating the transmission prohibition data and also stops supplying the generated transmission prohibition data to the communication control unit 115, and therefore the communication control unit 115 causes the LAN communication unit 113 to stop transmitting the radio transmission prohibition data.

FIGS. 15A and 15B are timing charts showing a case of the fourth embodiment, in which no interference occurs between the communication data transmitted by the transmission terminal (TT) 210 and the radio LAN data transmitted by the LAN terminal (LT) 160.

As shown in FIGS. 15A and 15B, the transmission terminal 210 transmits the radio transmission prohibition data (e.g., D204, D205, D206) at regular intervals when the radio communication data (e.g., T8, T9, T10) are transmitted from the transmission-side communication unit 111. The transmission terminal 210 transmits the radio transmission prohibition data so that each of the non-communication time periods T8, T9, T10 becomes not longer than a predetermined time period (which is obtained by adding the backoff time to the DIFS time period, for example) which is required for initiating transmission of a radio signal by the LAN terminal 160. The non-communication time period T8 is a time period between the completion of transmission of the radio communication data D1 and the initiation time of transmission of the radio transmission prohibition data D204. The non-communication time period T9 is a time period between the completion of transmission of the radio transmission prohibition data D204 and the initiation time of transmission of the radio transmission prohibition data D205. The non-communication time period T10 is a time period between the completion of transmission of the radio transmission prohibition data D205 and the initiation time of transmission of the radio transmission prohibition data D206. In this way, the transmission terminal 210 prohibits LAN terminals such as the LAN terminal 160 from transmitting radio data while the transmission terminal 210 transmits the radio communication data.

FIG. 16 is a flowchart showing processing in the transmission terminal 210 for transmitting the radio transmission prohibition data. First, the transmission prohibition data generation unit 214 monitors the transmission-side communication unit 111 and the LAN communication unit 113 via the communication control unit 115, and determines whether or not a radio data transmission (e.g., radio data items such as radio communication data D1 or D2) from the transmission-side communication unit 111 or the LAN communication unit 113 reaches completion (step S20). When it determined that the radio data transmission from the transmission-side communication unit 111 or the LAN communication unit 113 reaches completion (YES at step S20), the processing proceeds to step S21. The determination whether or not the radio data transmission from the LAN communication unit 113 reaches completion may be performed in a similar manner to whether or not the radio data transmission from the transmission-side communication unit 111 reaches completion.

Next, at step S21, the transmission prohibition data generation unit 214 initiates measuring (or counting) a non-communication elapsed time after the completion of the radio data transmission from the transmission-side communication unit 111 or the LAN communication unit 113.

The transmission prohibition data generation unit 214 determines whether or not a non-communication elapsed time that is initiated to be measured at step S21 exceeds the predetermined threshold (step S22). When the transmission prohibition data generation unit 214 determines that the non-communication elapsed time does not exceed the predetermined threshold (NO at step S22), the processing proceeds to step S23. On the other hand, when the transmission prohibition data generation unit 214 determines that the non-communication elapsed time exceeds the predetermined threshold (YES at step S22), the processing proceeds to step S24. Further, the predetermined threshold is set to the DIFS time period, for example.

At step S23, the transmission prohibition data generation unit 214 monitors the transmission-side communication unit 111 via the communication control unit 115, and determines whether or not the transmission-side communication unit 111 initiates a transmission of the radio communication data (that is, whether or not the radio communication data is being transmitted) (step S23). The transmission prohibition data generation unit 214 terminates the processing if the transmission-side communication unit 111 initiates transmitting the radio signal (YES at step S23). On the other hand, the transmission prohibition data generation unit 214 returns the processing to step S22 if the transmission-side communication unit 111 does not initiate transmitting the radio signal (NO at step S23), thereby repeating the processing.

At step S24, the transmission prohibition data generation unit 214 generates the transmission prohibition data. In this embodiment, the transmission prohibition data are the predetermined data to be transmitted to a predetermined communication address.

The transmission prohibition data generation unit 214 supplies the transmission prohibition data and the communication address as a designation of the transmission prohibition data generated at step S24 to the communication control unit 115 (step S25). The communication control unit 115 which has received the transmission prohibition data and the communication address, transmits the received transmission prohibition data (e.g., D204, D205, D206 in FIG. 15A) via the LAN communication unit 113 to the received communication address.

Next, the transmission prohibition data generation unit 214 determines whether or not the transmission prohibition data generated at step S24 have been transmitted for the predetermined time period (step S26). The transmission prohibition data generation unit 214 returns the processing to step S20 if the transmission of the radio transmission prohibition data for the predetermined time period has been completed (YES at step S26). On the other hand, the transmission prohibition data generation unit 214 causes the processing to proceeds step S27 if the transmission of the radio transmission prohibition data for the predetermined time period has not been completed (NO at step S26).

At step S27, the transmission prohibition data generation unit 214 monitors the transmission-side communication unit 111 via the communication control unit 115, and determines whether or not the transmission-side communication unit 111 initiates transmission of the radio communication data. The transmission prohibition data generation unit 214 terminates the processing if the transmission-side communication unit 111 initiates the transmission of the radio communication data (YES at step S27). On the other hand, the transmission prohibition data generation unit 214 returns the processing to step S25 if the transmission-side communication unit 111 does not initiates the transmission of the radio communication data (NO at step S27), thereby continuing the transmission of the radio transmission prohibition data. Further, the predetermined time period at step S26 can be set to an arbitrary time.

As described above, in the fourth embodiment, in a similar manner to the third embodiment, when the non-communication elapsed time, during which the transmission terminal 210 transmits no radio communication data such as video data exceeds the predetermined threshold, the radio transmission prohibition data are transmitted. In this way, during the non-communication time period, the LAN terminal 160 conforming to the IEEE802.11 standard using the same radio frequency band is not allowed to initiate a radio communication. Therefore, the transmission terminal 110 can transmit the radio communication data such as video data without causing the interference of the radio signals. Further, unlike the third embodiment, in the fourth embodiment, the calculation of the predetermined time period can be eliminated.

Further, in the fourth embodiment, the description has been made as to the case where another wireless communication system having the probability of interfering with the radio signal of the wireless communication system is the wireless LAN system conforming to the IEEE802.11 standard. However, another wireless communication system is not limited to this example and may be a wireless communication system performing access control using other methods such as a CSMA/CA method, and in this case, the similar advantageous effects can be obtained by the similar method.

In the above-described fourth embodiment, the description has been made as to the case where the transmission prohibition data generation unit 214 generates the transmission prohibition data intermittently so that the non-communication time period of the radio signal transmitted from the transmission terminal 210 becomes not longer than a reference time period (e.g., the DIFS time period), and transmits the radio transmission prohibition data via the communication control unit 115 and the LAN communication unit 113. However, the transmission prohibition data generation unit 214 is not limited to this example. The transmission prohibition data generation unit 214 may be configured so as to continue transmission of the radio transmission prohibition data until the transmission-side communication unit 111 initiates transmission of the next radio communication data, for example.

Fifth Embodiment

FIG. 17 is a block diagram schematically illustrating a configuration of a transmission terminal 310 in a wireless communication system according to a fifth embodiment. Elements in FIG. 17 that are the same as or correspond to those in FIG. 9 or 14 are assigned the same characters. The fifth embodiment is different from the above-described third or fourth embodiment in a respect of the transmission terminal 310. Therefore, a description will be made with particular emphasis on different features such as the transmission terminal 310 and its related matters.

Referring to FIG. 17, the transmission terminal 310 includes the transmission-side communication unit 111, the transmission-side data processing unit 112, the LAN communication unit 113, a transmission prohibition data generation unit 314, and the communication control unit 115. The transmission terminal 310 according to the fifth embodiment is different from that according to the third or fourth embodiment in a respect of the transmission prohibition data generation unit 314. Therefore, a description will be made with particular emphasis on different features such as the transmission prohibition data generation unit 314 and its relevant matters.

The transmission prohibition data generation unit 314 monitors the transmission-side communication unit 111 via the communication control unit 115, and detects a non-communication elapsed time, during which the radio communication data are not being transmitted/received by the transmission-side communication unit 111. If the detected non-communication elapsed time exceeds a predetermined threshold, the transmission prohibition data generation unit 314 generates the transmission prohibition data which prohibits a radio communication of the LAN terminal or terminals in the wireless LAN system 150. The transmission prohibition data generation unit 314 supplies the generated transmission prohibition data to the communication control unit 115, and the communication control unit 115 causes the LAN communication unit 113 to transmit the radio transmission prohibition data (e.g., D207 in FIG. 18A).

In the IEEE802.11 standard, a time required for a radio communication sequence can be set in the Duration/ID field of the header of the communication frame. The LAN terminal 160, which has received the communication frame having a set value, analyzes the communication frame. If a designation of the analyzed communication frame is not the LAN terminal 160, a Network Allocation Vector (NAV) indicating a transmission prohibition time period is set so that the communication sequence is not initiated during a time period indicated by this value, which is set in the Duration/ID field of the communication frame.

In the fifth embodiment, the transmission prohibition data generation unit 314 uses a unicast frame such as a CTS (clear to send) frame, a RTS (request to send) frame, and a data frame each conforming to the IEEE802.11 standard or the like, as the transmission prohibition data, and sets a value of the predetermined time period in the Duration/ID field of the header of the communication frame. The transmission prohibition data generation unit 314 set a communication address (e.g., an address of the transmission terminal 310) as a communication address to which the radio transmission prohibition data are transmitted. The communication address, to which the radio transmission prohibition data are transmitted, can be a communication address of another terminal other than the LAN terminal 160 placed around the transmission terminal 310 (the LAN terminal 160 using a radio frequency band used by the transmission-side communication unit 111 of the transmission terminal 310).

FIGS. 18A and 18B are timing charts showing a case of the fifth embodiment, in which no interference occurs between the communication data D1, D2 transmitted by the transmission terminal (TT) and the radio LAN data transmitted by the LAN terminal (LT).

For example, as shown in FIGS. 18A and 18B, the transmission terminal 310 transmits the radio transmission prohibition data D207, in which a predetermined time period is stored in the Duration/ID field, between a time period when the radio communication data D1 is transmitted from the transmission-side communication unit 111 and a time period when the radio communication data D2 is transmitted from the transmission-side communication unit 111. The transmission terminal 310 transmits the radio transmission prohibition data so that each of the non-communication time periods T11 and T12 is not longer than a reference time period (which is obtained by adding the backoff time to the DIFS time period, for example) which is required for initiating transmission of a radio signal by the LAN terminal 160, where the non-communication time period T11 is a time period between the completion of transmission of the radio communication data D1 and the initiation time of transmission of the radio transmission prohibition data D207, and the non-communication time period T12 is a time period between the end time of the NAV period D301 and the initiation time of transmission of the next radio communication data D2. In this manner, the transmission terminal 310 can prohibit the LAN terminal 160 from initiating transmission of the radio data.

Figure 19:
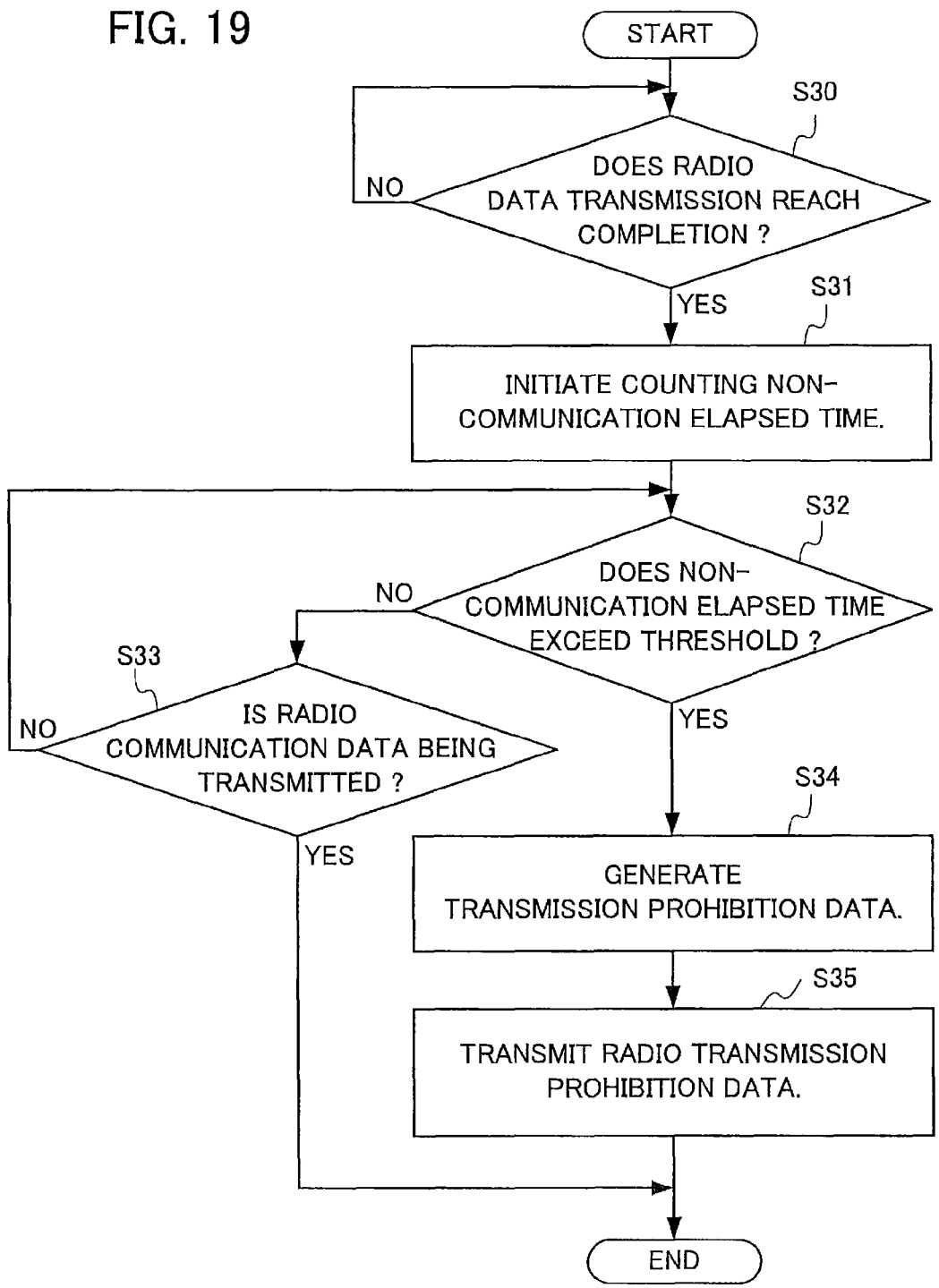
FIG. 19 is a flowchart showing processing of transmitting transmission prohibition data in the transmission terminal of FIG. 17.

FIG. 19 is a flowchart showing processing in the transmission terminal 310 for transmitting the radio transmission prohibition data.

First, the transmission prohibition data generation unit 314 monitors the transmission-side communication unit 111 via the communication control unit 115, and determines whether or not a radio communication data transmission by the transmission-side communication unit 111 reach completion (step S30). If the transmission-side communication unit 111 has received the radio communication data (YES at step S30), the processing proceeds to step S31.

Next, at step S31, the transmission prohibition data generation unit 314 initiate measuring (e.g., counting) a non-communication elapsed time from the completion of transmission of the radio signal from the transmission-side communication unit 111. The transmission prohibition data generation unit 314 determines whether or not the non-communication elapsed time measured at step S31 exceeds a predetermined threshold (step S32). The transmission prohibition data generation unit 314 proceeds the processing to step S33 if the non-communication elapsed time does not exceed the predetermined threshold (NO at step S32), and proceeds the processing to step S34 if the non-communication elapsed time exceeds the predetermined threshold (YES at step S32). In this embodiment, the predetermined threshold is set to the DIFS time period, for example.

At step S33, the transmission prohibition data generation unit 314 monitors the transmission-side communication unit 111 via the communication control unit 115, and determines whether or not the transmission-side communication unit 111 initiates the transmission of the radio communication data (e.g., whether or not the transmission-side communication unit 111 is transmitting the radio communication data). The transmission prohibition data generation unit 314 terminates the processing if the transmission-side communication unit 111 initiates the transmission of the radio communication data (YES at step S33). On the other hands, the transmission prohibition data generation unit 314 returns the processing to step S32 and repeats the processing if the transmission-side communication unit 111 does not initiate the transmission of the radio communication data (NO at step S33).

At step S34, the transmission prohibition data generation unit 314 generates the transmission prohibition data. The transmission prohibition data may be a unicast frame such as a CTS (clear to send) frame, a RTS (request to send) frame, and a data frame each conforming to the IEEE802.11 standard or the like, as the transmission prohibition data. The transmission prohibition data sets a value of the predetermined time period in the Duration/ID field of the header of the communication frame, for example.

As shown in FIGS. 18A and 18B, the predetermined time period to be set in the Duration/ID field is set so that a non-communication time period T12 between the end time of the NAV period D301 and the initiation time of transmission of the next radio communication data becomes not longer than the DIFS time period. For example, the predetermined time period to be set in the Duration/ID field is set to a value obtained by subtracting the DIFS time period multiplied by two from a transmission interval (a time period when no radio communication data are transmitted) between the radio signals (e.g., a VBI of video data), which is longer than the DIFS time period.

The communication address, to which the radio transmission prohibition data are transmitted, may be a communication address of another terminal other than the LAN terminal 160 placed around the transmission terminal 310 (the LAN terminal 160 using the same frequency band as that used by the transmission-side communication unit 111).

The transmission prohibition data generation unit 314 supplies the transmission prohibition data generated at step S34 and a communication address of the transmission prohibition data to the communication control unit 115 (step S35). The communication control unit 115, which has received the transmission prohibition data and the communication address, transmits the received transmission prohibition data to the received communication address via the LAN communication unit 113.

As described above, in the fifth embodiment, in a similar manner to the third embodiment, when the non-communication elapsed time during which the transmission terminal 310 transmits no communication data such as video data exceeds the predetermined threshold (e.g., step S32 in FIG. 19), the radio transmission prohibition data are transmitted (e.g., step S34 in FIG. 19). In this way, during a non-communication time period, the LAN terminal 160 conforming to the IEEE802.11 standard using the same radio frequency band is not allowed to initiate a radio communication.

Further, in the fifth embodiment, a wireless LAN communication frame conforming to the IEEE802.11 standard can be used as the transmission prohibition data by setting the LAN terminal 160 to have a NAV using the Duration/ID field of a header of the communication frame. In this way, the transmission of the radio transmission prohibition data is not always necessary during a time period when the communication of the LAN terminal 160 should be prohibited. Therefore, in this embodiment, a transmission time period of the radio transmission prohibition data can be reduced, an efficiency of the radio media of the transmission terminal 310 can be increased, and electric power consumption can be reduced.

Further, in the fifth embodiment, the description has been made as to the case where another wireless communication system having the probability of interfering with the radio signal of the wireless communication system is the wireless LAN system conforming to the IEEE802.11 standard. However, another wireless communication system is not limited to this example and may be a wireless communication system performing access control using other methods such as a CSMA/CA method, and in this case, the similar advantageous effects can be obtained by the similar method.

In the above-described fifth embodiment, the description has been made as to the case where as shown in FIGS. 18A and 18B, the predetermined time period to be set in the Duration/ID field is set so that a non-communication time period T12 between the end time of the NAV period D301 and the initiation time of transmission of the next radio communication data becomes not longer than the DIFS time period. However, predetermined time period to be set in the Duration/ID field is not limited to this example. For example, the predetermined time period to be set in the Duration/ID field is set to a value obtained by subtracting the DIFS time period multiplied by two from a transmission interval between the radio signals (e.g., a VBI of video data), which is longer than the DIFS time period.

For example, as shown in FIGS. 20A and 20B, an end time of the NAV period D302 may be set to a time after the initiation time of transmission of the next radio communication data D2. In this case, the predetermined time period to be set in the Duration/ID field is set to a value obtained by subtracting the DIFS time period multiplied by two from a transmission interval between the radio signals (e.g., a VBI of video data), which is longer than the DIFS time period.

Furthermore, as shown in FIGS. 21A and 21B, an end time of the NAV period D303 may be a time after the completion of transmission of the next radio communication data D2. In this case, for example, the transmission terminal calculates the data length of the communication data such as video data to be transmitted next from the transmission prohibition data generation unit 314 and the transmission time of the communication data, and then adds the calculated time to a transmission interval between the radio signals (e.g., a VBI of video data) which exceeds the DIFS time period to obtain a total of the calculated time and the transmission interval. The transmission terminal sets a value of the Duration/ID field to a value obtained by subtracting the DIFS time period from the total of the calculated time and the transmission interval.

Moreover, in the above-described third to fifth embodiments, the predetermined threshold used for determination of the non-communication elapsed time is set to the DIFS time period (steps S12, S22, and S30), it is not limited to such example. The predetermined threshold may be set to an arbitrary time as long as it is the DIFS time period or less. For example, the predetermined threshold may be set to a time period longer than the SIFS (Short Inter Frame Space) time and not longer than DIFS time period so that the LAN terminal 160 can receive the ACK signal from the AP 170.

Furthermore, in order to prevent interference with a radio signal transmitted by the AP 170, the predetermined threshold may be set to the SIFS time or less.

Furthermore, in the above-described third and fourth embodiments, the transmission prohibition data generated by the transmission prohibition data generation unit 114, 214 is not necessarily a communication frame which can be deciphered by the LAN terminal 160. The transmission prohibition data may be a radio signal in the same (or partially the same) radio frequency band as those used by the LAN terminal 160 and having a higher signal intensity than an intensity, by which the LAN terminal 160 can recognize the radio communication by carrier sensing.

In the transmission terminal 110, 210, 310 according to the third to fifth embodiments, the description has been made as to the case where the transmission-side communication unit 111 and the LAN communication unit 113 are separate units. However, the transmission terminal does not limited to such configurations; the transmission-side communication unit 111 may have a configuration also having a function of transmitting the radio transmission prohibition data.

In the above-described third to fifth embodiments, the transmission prohibition data generation units 114, 214, 314 may perform carrier sensing in advance via the communication control unit 115 and the LAN communication unit 113. In this case, if there exists a LAN terminal 160 using a radio signal with a predetermined signal intensity and with the radio frequency band used by the transmission-side communication unit 111 of the transmission terminal 110, the processing shown in FIG. 12, FIG. 16 or FIG. 19 is performed.

In the above-described third to fifth embodiments, it is desirable that the processing of the transmission prohibition data generation unit 114, 214, 314 are used for the cases where a series of data such as video data are divided and the divided data are transmitted at regular intervals (or intermittently), for example. These cases include, for example, (i) a case where the user instructs the transmission of data having a data length longer than a specific length from a user operation panel (not shown in the drawing), or (ii) a case where data in a specific data format are instructed to be transmitted, or (iii) a case where a transmission instruction of the data generated by the transmission-side data processing unit 112 using a specific application or a specific apparatus (e.g., an image pickup apparatus), or (iv) another case.

In these cases, the communication control unit 115 can control whether or not to cause the transmission prohibition data generation unit 114, 214, 314 to perform the processing by instructing the initiation and end of the processing to the transmission prohibition data generation unit 114, 214, 314.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A transmission terminal comprising:
a transmission-side data processing unit for generating communication data;
a transmission prohibition data generation unit for generating transmission prohibition data for prohibiting a wireless terminal other than the transmission terminal from transmitting a radio signal;
a communication unit for intermittently transmitting a first radio signal as radio communication data based on the generated communication data and a second radio signal as radio transmission prohibition data based on the generated transmission prohibition data; and
a communication control unit for controlling the transmission-side data processing unit, the transmission prohibition data generation unit, and the communication unit so that:
when the communication control unit causes the communication unit to transmit the radio communication data, the transmission prohibition data generation unit measures a non-communication elapsed time, during which the communication unit is not transmitting the radio communication data, and
if the non-communication elapsed time exceeds a predetermined threshold, the communication control unit causes the communication unit to transmit the radio transmission prohibition data based on the generated transmission prohibition data using at least partially the same radio frequency band as a radio frequency band of the radio communication data.

2. The transmission terminal according to claim 1, wherein the communication control unit causes the communication unit to transmit the radio transmission prohibition data so that a non-communication time period between adjacent transmission time periods of the first or second radio signal is shorter than a predetermined time period, which is required for the wireless terminal to initiate transmitting a radio signal.

3. The transmission terminal according to claim 2, wherein the communication control unit causes the communication unit to transmit the radio transmission prohibition data continuously.

4. The transmission terminal according to claim 2, wherein the communication control unit causes the communication unit to transmit the radio transmission prohibition data intermittently.

5. The transmission terminal according to claim 1, wherein the transmission prohibition data includes information of a transmission prohibition time period, during which data transmission of the wireless terminal is prohibited.

6. The transmission terminal according to claim 5, wherein the transmission prohibition time period is set so that a non-communication time period between an end time of the transmission prohibition time period and an initiation time of transmission of a next radio communication data is shorter than a predetermined time period, which is required for the wireless terminal to initiate transmitting a radio signal.

7. The transmission terminal according to claim 5, wherein the transmission prohibition time period is set so that an end time of the transmission prohibition time period is later than an initiation time of transmission of a next radio communication data.

8. The transmission terminal according to claim 1, wherein the communication unit includes:
   a first communication unit for transmitting the radio transmission prohibition data; and
   a second communication unit for intermittently transmitting the radio communication data.

9. The transmission terminal according to claim 1, wherein the access control performed by the wireless terminal is CSMA/CA.

10. The transmission terminal according to claim 1, wherein
   the wireless terminal conforms to the IEEE802.11 standard; and
   the reference time period is obtained by adding a backoff time to a DIFS time period.

11. A wireless communication system comprising:
   a transmission terminal for transmitting radio communication data in the form of a radio signal; and
   a reception terminal for that receiving the radio communication data;
   the transmission terminal includes:
   a transmission-side data processing unit for generating the communication data;
   a transmission prohibition data generation unit for generating transmission prohibition data for prohibiting a wireless terminal other than the transmission terminal from transmitting a radio signal;
   a communication unit for intermittently transmitting a first radio signal as radio communication data based on the generated communication data and a second radio signal as radio transmission prohibition data based on the generated transmission prohibition data; and
   a communication control unit for controlling the transmission-side data processing unit, the transmission prohibition data generation unit, and the communication unit so that:
   when the communication control unit causes the communication unit to transmit the radio communication data, the transmission prohibition data generation unit measures a non-communication elapsed time, during which the communication unit is not transmitting the radio communication data, and
   if the non-communication elapsed time exceeds a predetermined threshold, the communication control unit causes the communication unit to transmit the radio transmission prohibition data based on the generated transmission prohibition data using at least partially the same radio frequency band as a radio frequency band of the radio communication data.

12. A method of transmitting radio communication data from a transmission terminal; the transmission terminal including a transmission-side data processing unit, a transmission prohibition data generation unit, and a communication unit;
   the method comprising the steps of:
   intermittently transmitting, by the communication unit, the radio communication data;
   measuring, by the transmission prohibition data generation unit, a non-communication elapsed time, during which the communication unit is not transmitting the radio communication data, when the communication unit intermittently transmits the radio communication data;
   generating, by the transmission prohibition data generation unit, transmission prohibition data for prohibiting a wireless terminal other than the transmission terminal from transmitting a radio signal; and
   if the non-communication elapsed time exceeds a predetermined threshold, transmitting the radio transmission prohibition data based on the generated transmission prohibition data using at least partially the same radio frequency band as a radio frequency band of the radio communication data.

* * * * *